United States Patent [19]

Berenberg et al.

[11] 4,370,721
[45] Jan. 25, 1983

[54] METHOD FOR MODIFYING PROGRAMMED POSITIONS BY USING A PROGRAMMABLY CONTROLLED SURFACE SENSING ELEMENT

[75] Inventors: John A. Berenberg; William A. Haggerty; Richard L. Kegg, all of Cincinnati; Myron J. Schmenk, Milford; Ralph C. Taylor, Jr., West Chester, all of Ohio

[73] Assignee: Cincinnati Milacron Inc., Cincinnati, Ohio

[21] Appl. No.: 183,193

[22] Filed: Sep. 2, 1980

[51] Int. Cl.³ .................... G05B 19/18; G06F 15/46
[52] U.S. Cl. .................................. 364/474; 318/572; 364/170; 364/560
[58] Field of Search ............... 364/474, 475, 170, 560; 33/169, 174 L, 174 P, 174 PC; 318/572, 565; 408/8-13

[56] References Cited

U.S. PATENT DOCUMENTS

| 3,628,002 | 12/1971 | Meese | 364/170 X |
| 3,641,849 | 2/1972 | Kinney | 318/572 X |
| 4,061,952 | 12/1977 | Dinsdale et al. | 318/572 |

Primary Examiner—Joseph F. Ruggiero
Attorney, Agent, or Firm—John W. Gregg

[57] ABSTRACT

A method is disclosed for modifying coordinate data in a machining program in response to workpiece measurements made by a programmably controlled surface sensing element. The location of the workpiece and position of workpiece characteristics are determined by a series of programmed scanning cycles. The maximum, minimum and average measured positions of points on a workpiece surface are stored and may be used to calculate position offsets which may be used to modify a machining program. Further, the measured positions and offsets may be tested against programmed maximum and minimum limits to determine if the measured positions are within a tolerance band. In one embodiment, the positions of points on the workpiece surface are measured by a cutting tool operating in conjunction with a torque measuring circuit.

51 Claims, 16 Drawing Figures

4,370,721

METHOD FOR MODIFYING PROGRAMMED POSITIONS BY USING A PROGRAMMABLY CONTROLLED SURFACE SENSING ELEMENT

BACKGROUND OF THE INVENTION

The invention relates generally to the area of numerically controlled machines. Specifically, the invention provides a numerically controlled machine with a programmably controlled sensing element for detecting the location and position of reference characteristics on a workpiece. This capability enables the part programmer to cope with set-up and part-to-part variations, thereby minimizing operator intervention and significantly improving productivity.

While the invention of numerical control has greatly improved the speed and reliability with which many workpieces may be machined, there are many workpieces which still require a time consuming intervention by a skilled operator in the machining process.

The machining process begins with a part programmer who prepares a machining program based on drawings of a finished part. In preparing the program, the programmer defines a particular location of the workpiece on the machine as well as particular dimensional reference surfaces of the unmachined part. The programmer then prepares a machining program comprised of blocks of instructions and data which is defined relative to a programmer created program coordinate system. In operation, a control connected to the machine generates command signals in response to the machining program to move a cutting tool relative to the workpiece thereby machining the workpiece to the desired finished part.

However, being machining, the machine operator must first position the part within the machine coordinate system to a location defined by the part programmer. Typically, the machine coordinate system is represented by three mutually perpendicular linear axes of motion. After positioning the part, the machine operator manually feeds the toolholder close to designated reference surfaces on the part or its fixture; and then, using a hand held gage and progressively smaller jogs, the operator positions the toolholder as precisely as humanly possible close to the workpiece. When the axes are in position, the operator operates a position set push button which establishes the located workpiece surface as having a specified program coordinate. The procedure of precisely defining the location of the workpiece within the machine based coordinate system can take from ten to fifteen minutes.

Many large rough castings have significant dimensional variations from what was assumed by the programmer. For example, the location of holes and bosses may vary up to ⅛ inch from a nominal position from casting to casting. Therefore, before the holes or surfaces are machined, the operator must realign the dimensional coordinates of the program with the actual location of the elements on the workpiece.

To address this problem, the numerical control contains an offset feature which provides a program selectable coordinate offset to shift all dimensions within a portion of the program by an operator entered increment in each of the major linear machine axes. Therefore, the operator, following the programmer's instructions, measures the distances from a reference to the holes or bosses. He manually enters the difference between these distances and the programmer's published distances into preselected offsets. Since a large part may require a great many offsets, the loss in productivity is cumulative. The above manual operations not only require a relatively high skill level, but in effect, reduces a highly sophisticated and expensive numerically controlled machine into a hand operated machine.

One object of the claimed invention is to eliminate the necessity of the operator interrupting the machining cycle to define the exact location of the workpiece and the position of reference characteristics on the workpiece.

Another object of the invention is to provide a workpiece measuring system for measuring the position of a plurality of points on a reference surface and to determine maximum, minimum and average values of the measurements. The average values may be used to locate the center of a rough opening, hole, or boss or be used to find the best fit on a rough surface. The maximum value may be used to define the clearance from a rough surface, and the minimum value may be used to establish the minimum amount of material to be removed to clean up a rough surface.

A further object of the invention is to use the measured position of a surface to calculate an offset value from a programmed definition of the surface.

The invention further provides a test of measured values and offsets against maxima and minima defined by the programmer to guarantee the part is within tolerance.

A final object of the invention is to use a cutting tool and torque measuring circuit to accomplish the surface sensing and accurately measure the workpiece location and workpiece surface positions.

SUMMARY OF THE INVENTION

According to one embodiment of the invention a method is claimed for modifying coordinate data in a machining program in accordance with the positions of surfaces on a workpiece as measured by a sensing element. A scanning cycle is executed in response to the program to record the location of a number of points on a workpiece surface. The scanning cycle may be executed using a cutting tool and torque measuring circuit or any other surface sensing mechanism. The method includes the steps of storing the maximum, minimum and average magnitudes of the measured values. The method further includes the calculation of offsets which are used to align programmed data to the workpiece. Further, the measured values may be tested against programmed maximum and minimum values to determine if the workpiece is within tolerance.

DESCRIPTION OF THE PREFERRED EMBODIMENT

Figure 1:
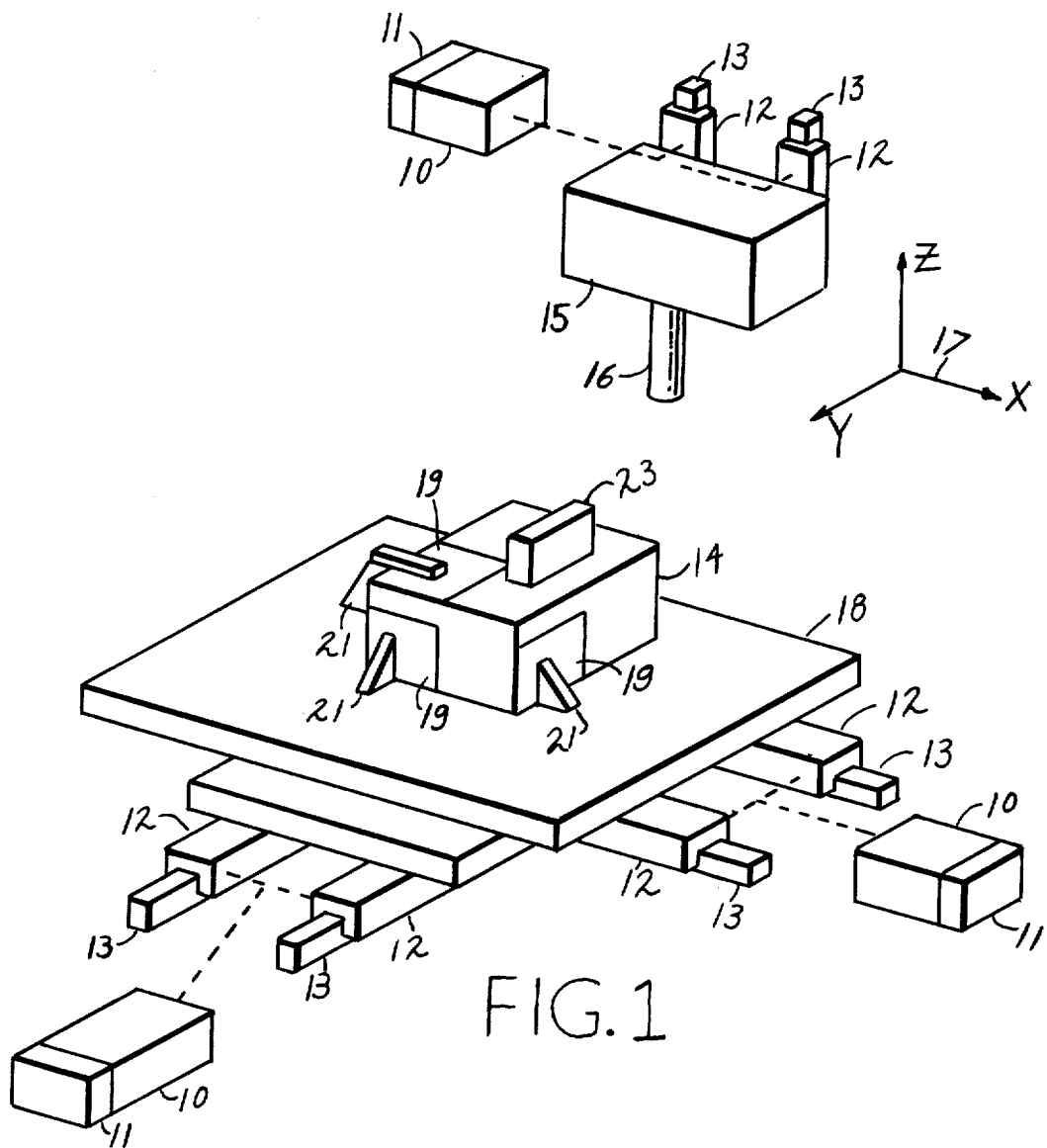
FIG. 1 is an illustration of a machine to which the invention may be applied.

FIG. 1 illustrates in schematic form one type of machine to which the claimed invention may be applied. Motors 10 and associated position transducers 11 are mechanically connected to slide 12 for moving the slides 12 along the stationary ways of 13 and generating signals representing the relative positions of the slides 12. The slides 12 and stationary ways 13 are arranged parallel to the mutually perpendicular axes of the triordinate coordinate system 17. A machine coordinate system is established by virtue of the mechanical connections of the motors 10 and position transducers 11 with the slides 12.

The workpiece 14 is carried by the table 18 which is in turn attached to those of the slides 12 which are parallel to the X and Y axes of the coordinates 17. A tool holder 15 is affixed to the one of the slides 12 which is parallel to the Z axis of the coordinates 17. A sensing element 16 is associated with tool holder 15. Relative motion of the sensing element 16 with respect to the workpiece 14 is accomplished by driving the motors 10. The workpiece 14 is held in place on table 18 by fixturing clamps 21 located on locating reference surfaces 19. Provided that the illustrated workpiece 14 is properly aligned on table 18, the locating reference surfaces 19 will define planes parallel to the planes defined by the coordinate axes 17. The workpiece may include a feature or characteristic such as rib 23, the position of which, with respect to the locating reference surfaces 19, varies from workpiece to workpiece as a result of manufacturing variables. Further, the precise position of the locating reference surfaces 19 with respect to the machine coordinate system may vary from workpiece to workpiece because of changes in or movement of the fixturing clamps 21.

Figure 2:
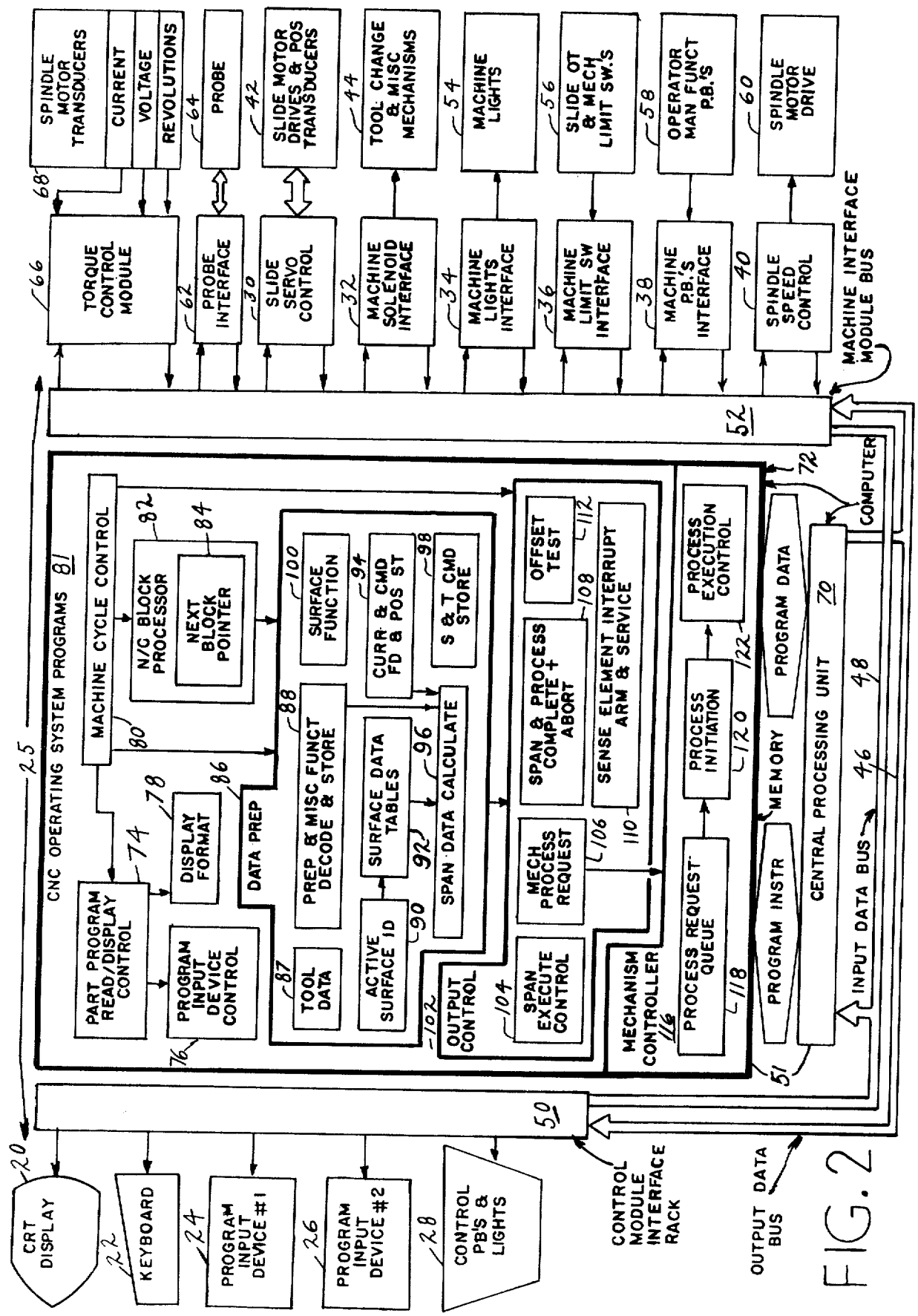
FIG. 2 is a general block diagram illustrating a computer numerical control which may be utilized to practice the claimed invention.

All motion of the slides 12 are controlled by the control 25 illustrated in FIG. 2 by signals generated and exchanged with the slide motor drives and position transducers 42. The invention herein describes a method of determining the variations of position of the locating reference surfaces 19 and workpiece features such as feature 23 and automatically modifying the positioning commands generated by the control 25 to machine the workpiece 14 in accordance with a machining program stored in control 25 independently of these position variations.

FIG. 2 is a general block diagram illustrating the architecture of a computer numerical control 25 in which the invention may be embodied. While the particular components depicted in this figure are those used in the computer numerical control manufactured by Cincinnati Milacron Inc., the invention may be implemented on any computer numerical control including equivalent components. Consequently, architectural detail should not be construed as limitations on the methods claimed in this invention.

The primary communicative link between the operator and the control is the set of control console devices including the CRT display 20, the keyboard 22, the program input devices 24 and 26 and the control push buttons and lights 28. These devices are in turn coupled to the computer 51 through the control module interface rack 50. All information exchanged between these devices and the computer is carried over the input data bus 48 and the output data bus 46. These buses consist of eight parallel signal lines. Communication between the machine and control by which means the control monitors machine conditions and commands machine operation is accomplished through the set of machine interfaces including the slide servocontrol 30, the machine solenoid interface 32, the machine lights interface 34, the machine limit switch interface 36, the machine push button interface 38 and the spindle speed control 40. These interfaces control the following respective machine elements: the slide motor drives and position transducers 42, the tool change elements and other miscellaneous mechanisms 44, the machine lights 54, the machine slide overtravel and other mechanism limit switches 56, the operator function push buttons 58 and the spindle motor drive control 60. These machine devices are coupled through their respective interfaces to the computer through the machine interface bus 52 and all information exchange between these devices and the computer is carried by the input data bus 48 and output data bus 46.

The surface sensing information is detected by a probe 64 which is connected to the machine interface bus 52 via a probe interface 62. In applicant's preferred embodiment, the probe 64 is a commercially available three-dimensional contacting probe which contains a limit switch contact that is activated upon probe deflection and deactivated when the probe is undeflected. The state of the probe limit switch is detected by the probe interface 62 which transmits this information via machine interface bus 52. As will be appreciated by those who are skilled in the art, the invention may be practiced with other surface detecting means, e.g. a capacitive sensor, a photoelectric sensor, an acoustic sensor, or other radiation sensing means.

As an alternative to the surface contacting probe 64, the invention provides a torque control module 66 which monitors spindle motor transducers 68. The spindle motor transducers measure the current, voltage and angular velocity of the spindle motor. The details of the torque control module 66 are described in U.S. Pat. No. 4,237,408 which is owned by the assignee of this application and is incorporated by reference herein. Any other commercially available cutting force sensing system that permits the programmer to define a detectable force limit could be used in place of module 66 and transducers 68.

The computer 51 consists basically of a memory 72 for storing program instructions and program data and a central processing unit 70 for interpreting program instructions and manipulating the program data. An operating system program 81 controls the sequence of executions of programs within the computer. Under supervision of the machine cycle control program 80, a part program read/display control program 74 controls the input of a machining program and other input information from the input devices 24, 26 and the keyboard and push buttons 22 and 28. The input device control program 76 is a subroutine for controlling the operation of a tape reader or other input mechanism. The display format program 78 defines the character locations and other display operations which are related to the CRT display 20. The N/C block processor program 82 decodes the incoming data, performs parity and other error checks and converts the data into a format useful to the numerical control.

The data preparation program 86 performs the general function of sorting the data processed by the N/C block processor 82 and storing the data in its respective storage locations. Under control of the data preparation program 86, the tool data program 87 will store the active tools being used as well as compensation values for the length or diameter of these tools which may be entered manually by the operator or automatically by an automatic tool gauge. The computer numerical control 25 considers the probe 64 to be a type of tool, and therefore the tool data program 87 will store tool number information identifying the probe as well as probe length and probe tip diameter data. The preparation and miscellaneous function decode and storage program 88 responds to a block of data and decodes all appropriate miscellaneous prespan and postspan functional information affecting spans required by the preparatory functions. This program responds to a number of new preparatory function G-codes defined by this invention in order to initiate the scanning cycle and arithmetic functions required. Further, this program responds to input data for activating and balancing the torque control circuit as well as defining torque limits. The active surface identifier program 90 activates an offset requested by the programmer and activates the appropriate surface data tables 92 for storing the measured information. The current and commanded feed rate and position store 94 maintains current and future feed rate and position data. Given the position and feed rate data and other information for modifying the tool position, the span data calculate program 96 determines the magnitude of a current span length and determines the axial displacements and feed rates to achieve the desired span. The spindle speed and tool command store 98 defines the spindle speeds and tools requested by the programmer during the span being executed.

The output control program 102 receives the data from the data preparation program 86 and controls the execution and transfer of that data to the machine elements. A span execute control program 104 controls the generation and distribution of command signals representing axial coordinate data to the various servomechanisms. The mechanism process request program 106 controls the execution of prespan and postspan machine functions. The span and process complete or abort program 108 follows the execution of a particular machining span by the machine and determines the sucessful execution of a particular machining span or its premature termination. The sense element interrupt arm and service program 110 controls the activation of the probe 64 or torque sensing module 66. If the surface sensing element is activated, the program then monitors for an interrupt from the surface sensing element which indicates the surface has been detected and directs the activity required by the effective preparatory function. The offset and test program 112 executes totally arithmetic functions defined by the programmer to either calculate offsets or perform tolerance band tests as a result of surface sensing.

The mechanism controller 116 responds to requests from the mechanism process request program 106 to activate the necessary machine elements to execute the requested machine process. The process request queue 118 stores a number of requested processes; and the process initiation program 120 services to the queue and intitiates the processes stored therein. The process execution control program 122 monitors the execution of the activated processes and determines when these processes have completed their activity.

Figure 3:
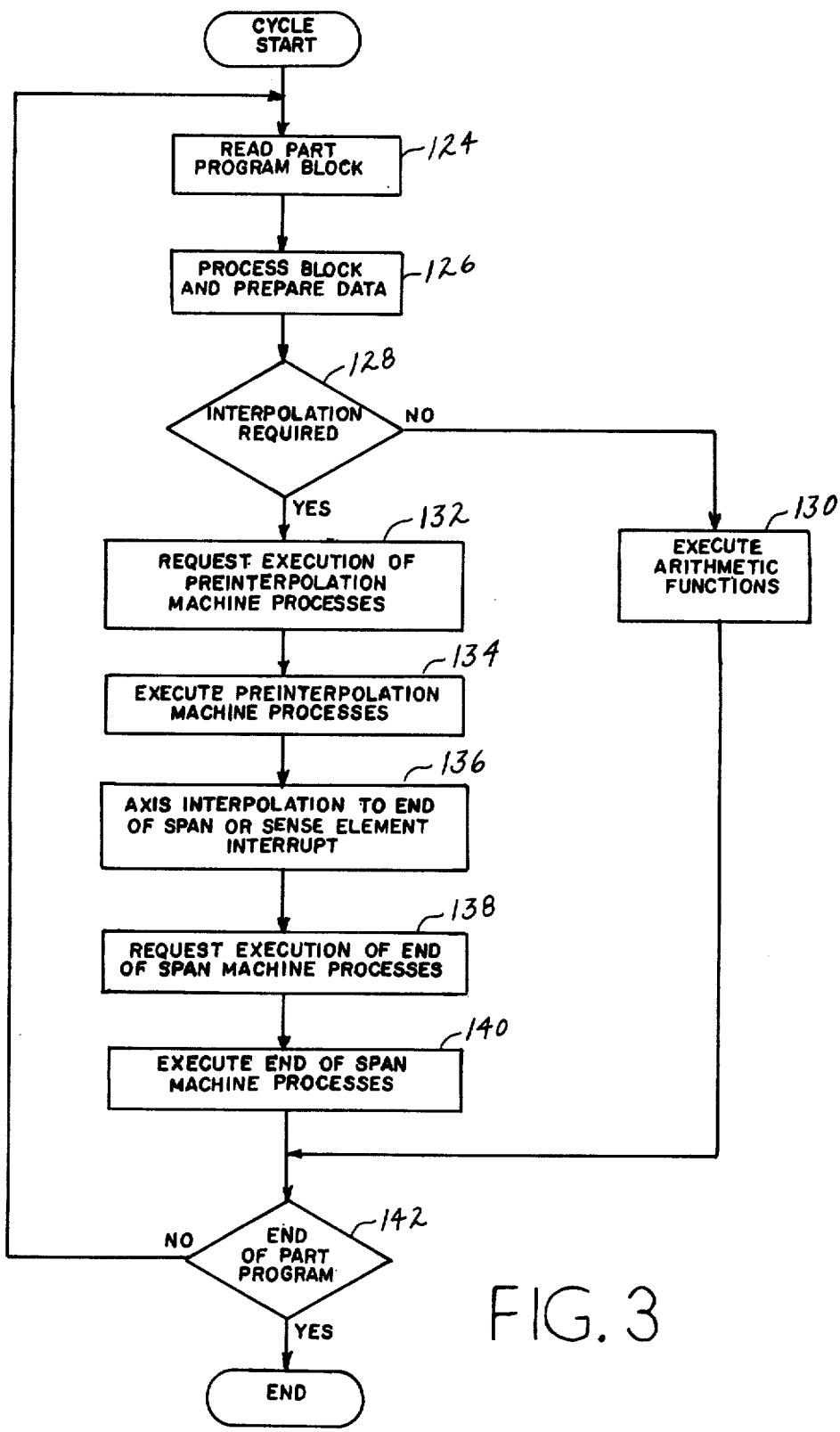
FIG. 3 is a flow chart illustrating the process steps for executing a general machine cycle of operation.

FIG. 3 is a flow chart of a general machine cycle and depicts the interaction of the components of the blocks of FIG. 2 as they act upon a block of information in a machining program. Assuming that the control is in a numerical control mode of operation as opposed to a manual or manual data input mode, the machine cycle is initiated when the operator depresses a cycle start push button. In response to the receipt of an input signal from the cycle start push button, the machine cycle control program 80 of FIG. 2 directs that a block of instructions and associated data be transferred from one of the program input devices 24 or 26. Process step 124 requires a transfer of the block of information into the control from an input device. Punch paper tape readers and flexible disc drives are typical of the types of program input devices commonly used. The current active input device is identified by the part program and read display control program 74 which in turn selects the appropriate input device operate program from the set of programs 76. Part program data is then transferred from the active input device to the buffer storage area associated with the N/C block processor program 82.

The process step 126 of FIG. 3 requires that the block of information be processed. The N/C block processor programs 82 of FIG. 2 perform data error checks and convert the data from the code in which it is received from the input device to binary. The machine cycle control program 80 then directs that the data preparation program 86 separate the machine slide data from the machine mechanism data and calculate the incremental displacements of the machine slides. The machine cycle control program 80 directs the output control program 102 to separate the axis and interpolation data from such mechanism operations as spindle speed, tool number and miscellaneous function commands. The output control program 102 then transfers span length and feed rate data to the servocontrol 30 via the machine interface bus 52.

Process step 128 decides whether interpolation is required. With the present invention, certain blocks of information may be programmed in which no slide motion occurs, but certain computational functions must be performed. If no interpolation is required, the process proceeds to step 130 which requires that the arithmetic functions be executed. Referring back to FIG. 2, in blocks of information requiring arithmetic operations, special preparation codes will be decoded by the decode and store block 88; and the surface function program 100 will assemble the necessary information and data to execute the requested arithmetic function. Thereafter the output control 102 will cause the offset and test program 112 to execute the required arithmetic functions. The span process complete block 108 will detect when these arithmetic functions have been completed and direct the process on to the next block of data.

Referring back to FIG. 3, if interpolation is required by process step 128, the process proceeds to step 132 which initiates the execution of those machine processes which must occur prior to moving the machine slides, e.g. turning on the spindle and coolant, activating the torque control module, establishing a necessary torque limit, etc. The output control program 102 of FIG. 2 initiates a machine process by activating the mechanism controller 116 which services the process queue 118. The effect of the activation is to inhibit the start of axis interpolation and permit the mechanism controller 116 to execute the requested prespan machine processes as defined in step 134 of FIG. 3.

After the requested processes are complete, the process execution control program 122 causes the mechanism controller 116 to generate a start of span N/C cycle release signal which allows the CNC operating system to permit axis interpolation to end of span or sensing element interrupt as defined in process step 136 of FIG. 3. When executing a scanning cycle along one axis of motion, the scanning block of information defines an end point inside a workpiece surface. Consequently, when the probe contacts the workpiece or the cutting tool detects the workpiece, the active sensing element interface, i.e. torque control module 66 or probe interface 62, will generate an interrupt requiring service by the sense element interrupt arm and service program 110. This will cause an immediate inhibit of slide motion; and upon completion of the scanning cycle, an end of span signal will be generated. When the workpiece is not present, an end of span is achieved in the normal fashion. In either event, process step 138 requires that the output control program 102 initiate the execution of postspan machine processes.

The particular processes to be executed after interpolation include such functions as stopping the spindle, turning off coolant and changing tools. The CNC operating system activates the mechanism controller 116 which proceeds to execute these processes as provided in process step 140 of FIG. 3. The CNC operating system is prohibited from continuing with the automatic machine cycle again until the mechanism controller 116 generates and end of span N/C cycle release signal. As provided in process step 142 of FIG. 3, if the machining program is not finished, the final N/C cycle release will initiate the transfer of another block of information and the execution of another machine cycle. The process of FIG. 3 continues until the end of the part program.

The invention provides the programmer with the capability of using surface detecting elements to measure the positions of workpiece characteristics and store the positions for subsequent use. In the preferred embodiment, a surface measuring cycle is initiated with special preparatory functions labeled by a G address. A two-digit G word may arbitrarily be chosen to accommodate programming standards. For purposes of this disclosure, a Gpp will define a measuring cycle using the surface contact probe, and a Gtt will define a measuring cycle using cutting tool torque.

As previously discussed, the tool change function is an end of span function. Therefore, in the block of information preceding a measuring cycle the programmer must define a tool change cycle to load either the probe or the appropriate cutting tool into the tool holder.

In processing a workpiece, generally it is first required to define the location of the workpiece relative to the programmed coordinate data. Thereafter, various workpiece characteristics may be defined. Typically, the rough workpiece will have previously machined locating reference surfaces in the X, Y, and Z axes. Therefore, the programmer can define successive measuring cycles along each of the axes of motion to measure the exact location of these surfaces and establish a program starting point therefrom. In practice, assuming the surface contact probe is to be used, the programmer would load the probe into the tool holder and move the probe to a position opposite the X reference surface. The following block data defining a workpiece locating instruction block would be programmed in the machining program:

Nnnn Gpp Xxxxxxxx Iiiiiiii

The Nnnn defines the sequence number of the block in the machining program. The Gpp is a surface measurement instruction defining a surface contact measuring cycle. The X address defines the axis in which the measuring cycle will occur, and the X work numeric data defines a location along the X axis. The Iiiiiiii, an assumed coordinate, defines the coordinate value to be assigned to the X axis locating reference surface.

Assuming that the part locating cycle is to occur after the operator has initialized the machine and aligned the slides, all slide moves thereafter generate current position data having values measured with respect to the machine coordinate system. As previously stated, however, machining program coordinate values are measured relative to a programmer defined program coordinate system. The effect of assigning a programmed coordinate value to an actual slide position is to generate a translated current slide position reflecting a translation of the current slide position with respect to the machine coordinate system. Thereafter, all slide position commands generated by the control in response to the machining program will be modified to reflect this translation. Thus, the program coordinate system is effectively translated with respect to the machine coordinate system. The above block of information will be read and decoded by the N/C block processor 82. The data preparation programs 86 will decode the preparatory function and prepare a measuring cycle of operation to be executed by the output control 102. The process steps for executing the cycle of operation are shown in FIGS. 4a through 4c.

Figure 4A:
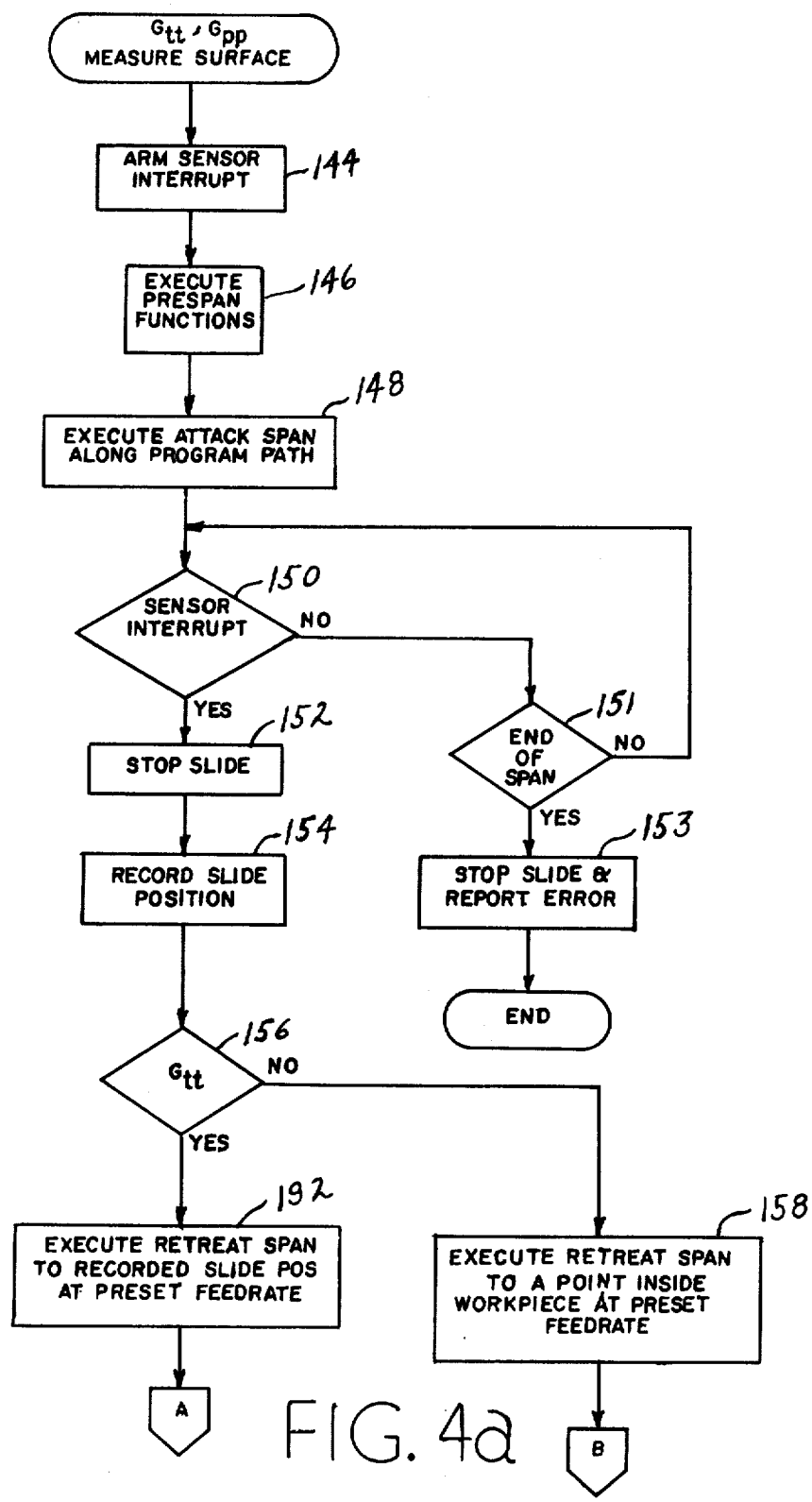
FIGS. 4a through 4c are a flow chart depicting the process steps necessary to measure a point on the workpiece.
Figure 4B:
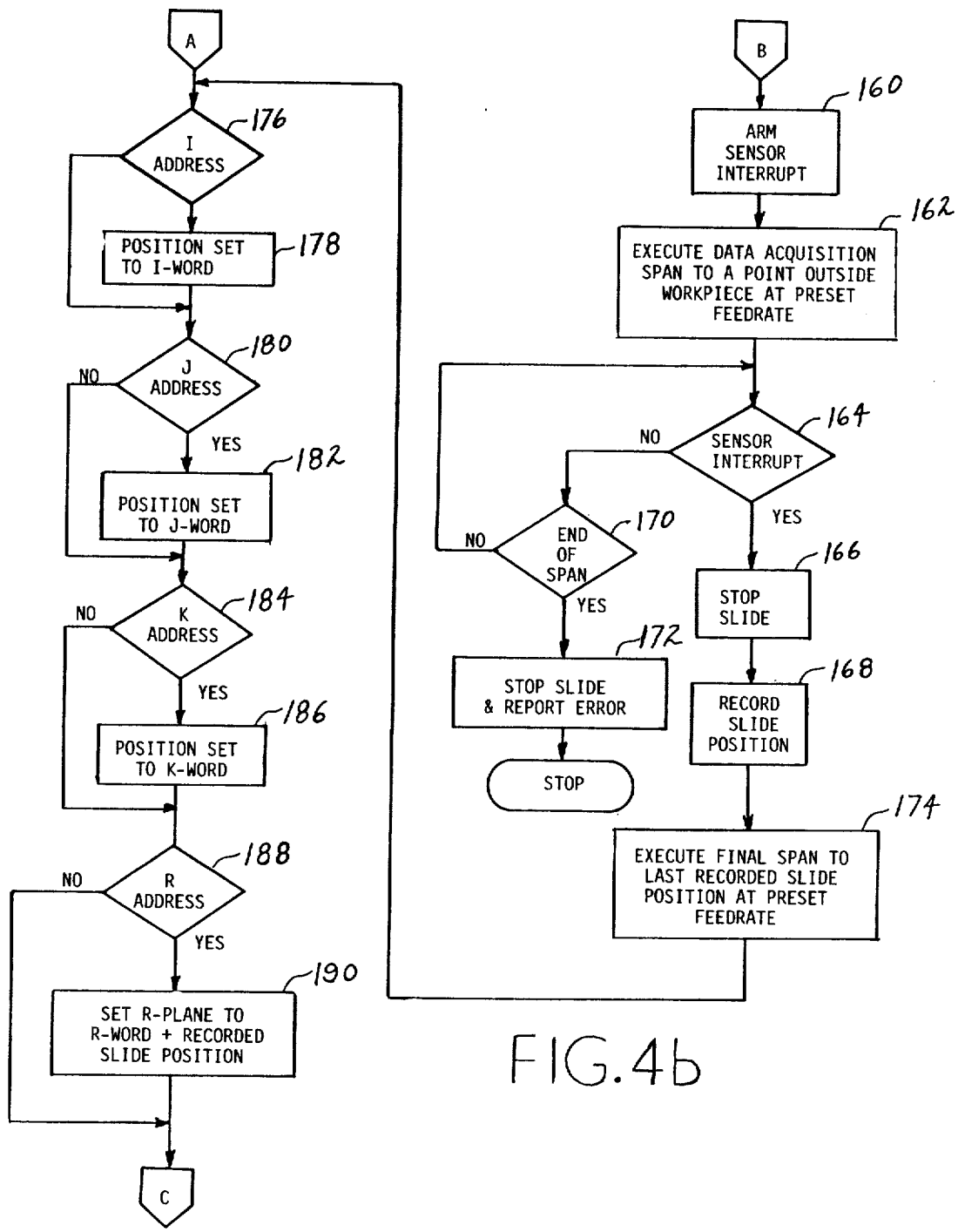
Figure 4C:
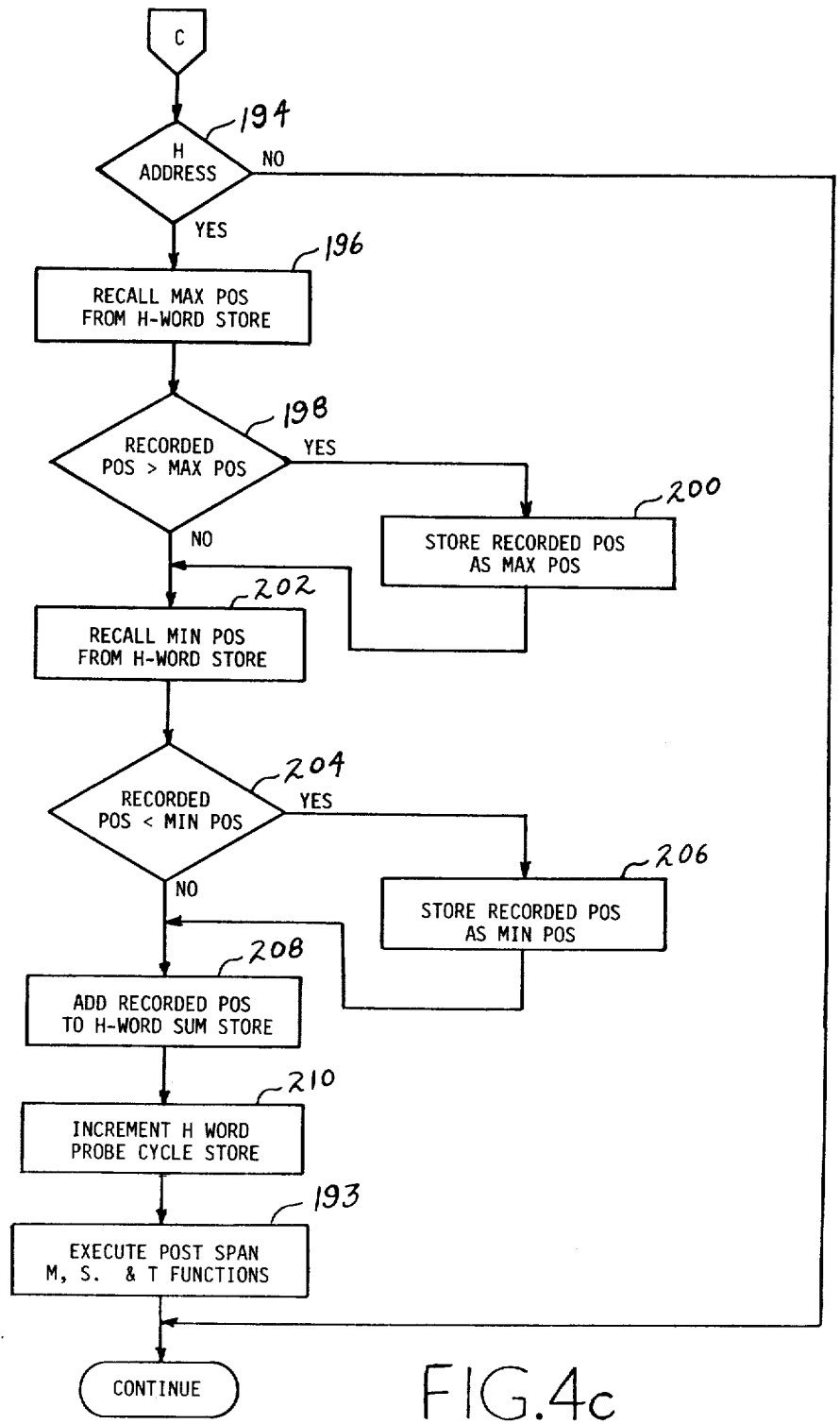

Referring to FIG. 4a, the process step 144 requires that the sense element interrupt service program 110 arm the interrupt of the active sensing element interface, i.e. the torque module 66 or probe interface 62. The process step 146 requires that the output control 102 execute all necessary prespan functions. In the preferred embodiment, a block of information containing a measuring cycle instruction may include any of the standard miscellaneous spindle speed, and tool functions. Next, process block 148 causes the control to generate scanning command signals to execute an attack span along the programmed path at a preset feed rate. A nonprogrammable preset feed rate is chosen to improve repeatability and minimize the cycle time. If a feed rate is programmed with the measuring cycle instructions, it will be stored for the next nonmeasuring block of information. The probe moves along the X axis toward the X axis locating reference surface. Decision block 150 determines whether a sensor interrupt occurs along that path. If no interrupt occurs and the probe reaches the programmed X dimension as determined by decision step 151, the process step 153 stops the slides and reports an error condition because the workpiece is not at a location anticipated by the programmer. If the probe contacts a point on the reference surface and causes an interrupt to the system, decision step 150 will cause process step 152 to inhibit the slides; and process step 154 will cause an initial position signal representing the position of the point on the reference surface to be recorded.

Upon contact, the position of the sensing element may be derived from several sources. In some situations, the slide servocontrol 30 will contain registers that indicate current slide position. In these situations, those registers may be read and an axis position signal recorded. In other situations, the span execute control within the output control 102 may contain a table of current slide positions. In the event that the sense element interrupt service program 110 detects an interrupt and causes the span abort program 108 to inhibit slide motion, the axis position signal may be read from the current slide position table in the span execute control 104. When executing a measuring cycle along axes of motion perpendicular to the centerline of the sensing element, the axis position signal representing the position of the sensing element is modified by a first compensation representing the sensing element radius to produce the recorded initial position signal representing the position of the detected point on the reference surface. When executing a measuring cycle parallel to the sensing element centerline, the axis position signal is modified by a second compensation signal representing the sensing element length to produce the recorded initial position signal.

The attack span of the probe into the X reference surface will typically occur at a relatively high feed rate. Therefore, because of following errors and other characteristics of the system, the recorded initial position will not be within an acceptable tolerance. If the surface contacting probe is being used, decision step 156 will advance the process to step 158 which will generate a retreat command signal representing a retreating probe motion along the X axis to a position a predetermined distance inside the workpiece surface as defined by the initial position signal. The process then proceeds to step 160 of FIG. 4b which causes the sensor interrupt again to be armed. Following that, process step 162 generates a data acquisition command signal which causes a further retracting motion through a fixed displacement to a point outside the workpiece surface at a slower feed rate. Decision step 164 detects the sensor interrupt which indicates that the probe has lost contact with the detected point on the X axis locating reference surface. In response to this interrupt, process step 166 inhibits the slide motion; and process step 168 records an X coordinate signal which represents the position of the point on the reference surface, i.e. the position of the sensing element as modified by the length or radius of the sensing element. If no sensor interrupt occurs, and the end of span is reached as determined by decision step 170, slide motion is inhibited; and an error is indicated. Assuming a sensor interrupt did occur in response to the probe losing contact with the workpiece, the process step 174 generates a final command signal to move the probe at a slow preset feed rate to a position adjacent to the X axis locating reference surface; and the tool holder centerline will be displaced from the surface a distance equal to the probe radius.

The process then moves to decision step 176 which detects the presence of the I address. The I address requires that process step 178 establish that the detected point on the reference surface which is represented by the current position of the probe as modified by the probe radius be assigned the coordinate value defined by the I word. It should be noted that in setting up the machine in preparation for executing the program, upon loading the probe into the tool store area on the machine, the machine operator must also load the probe length and probe diameter data. This data is stored in the tool data store 87 with other tool information. Since no other information was programmed in this particular block, no postspan functions are required; and the process continues to the next block of information.

To define program coordinates for the Y and Z reference surfaces, the programmer would first define a workpiece locating instruction block which would generate scanning command signals to position the probe opposite the Y axis locating reference surface; and the the following block of information would be defined:

Nnnn Gpp Yyyyyyyy Jjjjjjjj

Upon detecting the Gpp instruction, and the Y address, the data preparation program 86 and the output control 102 would respectively prepare and execute an attack span, a retreat span, a data acquisition span and a final span to move the probe along the Y axis of motion and bring the probe in contact with the Y axis locating reference surface. At this point, decision step 180 would detect the J address and cause the process block 182 to define the Y axis locating reference surface as the J word.

The process would be completed utilizing process blocks 184 and 186 for the Z axis of motion to establish the Z axis locating reference surface as the K word by utilizing the following workpiece locating instruction block of information:

Nnnn Gpp Zzzzzzzz Kkkkkkkk Rrrrrrrr

In the above block of information, decision step 188 detects the presence of the R address. The R word defines a fixed cycle clearance plane a predetermined distance above the workpiece surface for moving the tool between fixed cycles in hole cutting and finishing operations. The measuring cycle enables the programmer to accurately establish the location of this plane. The R word represents an increment to be added to the surface position to define the R plane; therefore, in FIG. 4b, after the R address is sensed by step 188, step 190 would set the R plane to the increment defined by the R word plus the magnitude of the Z coordinate signal recorded in block 168.

If the part programmer had decided to use cutting tool torque to detect the reference surfaces, the above blocks of information would be identical with the exception that Gtt would be used in place of the Gpp and an Fffff would be programmed. Upon the data preparation program detecting the torque preparatory code, it would cause the output control 102 to arm the torque control module interrupt which would respond to the cutting torque being equal to or exceeding a previously defined torque limit. The torque limit represents a magnitude of torque indicating a superficial contact of the cutting tool with the workpiece. Referring to process steps 144, 146 and 148 of FIG. 4a, the data preparatory program 86 and output control 102 would function in a manner as described earlier and initiate an attack span along the programmed axis toward the locating reference surface at a feed rate defined by the F word. The sensor interrupt would occur when the torque control module produced a contact signal representing a cutting torque equal to or exceeding the torque limit, and the interrupt would cause the interrupt service program 110 to inhibit slide motion and record a Z coordinate signal representing the surface position. Decision step 156 would advance the process to step 192 which would generate a retreat command signal in response to the Z coordinate signal to execute a retreat span along the programmed axis to the recorded position. At this point, the process would continue to decision step 176 and function in a manner as earilier described.

The description of FIG. 4 up to this point described a first measuring cycle mode in which the reference surfaces are relatively well-defined, e.g., machined surfaces. However, rough castings may contain rough surfaces and ribs that have substantial variations. In this case, probing only a single point on the surface cannot give an accurate definition of surface location. Therefore, the surface sensing cycle has a second operational mode which allows the programmer to probe many points along the surface and accumulate the relevant statistical characteristics of the measured coordinates, e.g. the maximum values, minimum values, average values, standard deviation, median, etc.

Assume the workpiece contains an unmachined cast rib running parallel with the Y axis of motion and the programmer wishes to define the location of an edge of the rib in the X axis of motion. To accomplish this, the probe must be positioned at different locations along the Y axis; and at each location, a measuring cycle is defined along the X axis of motion using the following block of information:

Nnnn Gpp Xxxxxxxx Hhh

The preparatory code again indicates that the surface contacting probe will be used in the measuring cycle; and the data prep program 86 and output control 102 will prepare an attack span toward the edge of the rib along the X axis at the preset feed rate. Since the probe is being used to sense the surface, a retreat span, data acquisition span and final span will be executed; and an X coordinate signal representing the position of a point on the edge of the rib will be recorded as required by block 168 of FIG. 4b. The process then moves to step 194 of FIG. 4c which determines whether the H address is present. The H address has a two digit word associated with it that defines an active surface store which is stored in the active surface identifier table 90. Each H word store has five major storage locations for storing selected coordinate signals. The first location stores a set of X, Y and Z coordinate signals representing the maximum magnitudes of the measured coordinate positions; the second location stores a set of X, Y and Z coordinate signals representing the minimum magnitudes of the measured coordinate positions; the third location stores a set of X, Y and Z coordinate signals representing the sum of the measured positions and the fourth location stores an increment number signal representing the number of measurements taken to define a reference surface. Therefore, by taking the signals from the third and fourth storage locations, the average of the measured coordinate positions over the whole measuring cycle may be computed. The fifth location stores a set of X, Y and Z offset signals which will be described later.

Returning to process step 194 of FIG. 4c, the presence of the H address requires that process block 196 recall a previously stored X coordinate signal from the first location in the store identified by the H word. To determine the larger coordinate signal, process step 198, compares the magnitudes of the previously stored signal and the current X coordinate signal. If the current coordinate signal is greater, process step 200 causes the current X coordinate signal to be stored as the maximum measured position in the first location defined by the H work; otherwise the stored coordinate signal in the first location remains unchanged. Next, process step 202 recalls a previously stored X coordinate signal from the second storage location in the H word store. Process step 204 compares the magnitudes of the current X coordinate signal and the previously stored signal to determine the smaller coordinate signal. If the current X coordinate signal is less, it is stored in the second location of the H word store as the new minimum measured position in accordance with process step 206. Otherwise, the stored minimum position remains unchanged. Next, the current X coordinate signal is summed with the previously stored X coordinate signals in the third storage location in the H word store via process block 208. In process block 210, the number contained in the fourth storage location of the H word store is incremented once. Thereafter the process proceeds to step 193 to execute postspan functions.

Each time the measuring cycle is executed at a different location along the Y axis, a different X coordinate signal defining the position of the edge of the rib is generated, and the signals in the locations of the H word store are updated. Consequently, after a number of measuring cycles, the programmer will have accumulated significant data identifying the edge of the rib. He will know the high spots along the edge, the low spots and be able to generate an X average coordinate signal representing the average measured position of the rib in the X axis. The maximum and minimum measured positions may be used to determine the amount of material that may be removed to just clean up the surface or define the actual clearance above the surface. If it is required to place holes along a line a certain distance from the edge of the rib, the average measured position of the edge may be used to locate the line. However, if the holes are to be placed along the centerline of the rib, a measuring cycle is executed which measures an equal number of points on each rib edge. The measured average position of the points will define the average centerline of the rib. While the previous example disclosed probing and accumulating measured positions relative to the X axis of motion, by a similar mechanism, positions may be measured and stored relative to the Y and Z axes of motion.

In order to drill the holes along the center line of the rib, the programmer must locate the center of each hole from the edge of the rib in the X axis. Therefore, a programmed X axis coordinate representing the programmer's definition of the edge of the rib must be correlated to the actual edge position as located by the probe. As discussed earlier, the first measuring mode may be used in conjunction with a programmed I word representing the programmer's definition of the rib edge. However, the effect of this operation is to translate all of the programmed coordinates relative to the measured location. This is desirable when locating the workpiece initially; but when defining individual workpiece characteristics, e.g. an edge of a rib, it is only necessary to modify the programmed coordinates that define the machine operation relative to that characteristic; and other programmed coordinates should not be affected.

Therefore, the invention provides several arithmetic preparatory codes, one of which may be used to calculate an offset signal representing the difference between a measured workpiece characteristic position, e.g., a rib edge, and the programmer's definition of that position. Any time the programmer desires to operate relative to that workpiece characteristic, he utilizes the associated offset which effects a modification of command signals derived from programmed coordinate values in accordance with the measured actual position of a workpiece characteristic; however, command signals derived from other program coordinates are not changed.

Therefore to calculate an offset relative to the edge of the rib, the programmer would define the following block of data:

Nnnn (OFS G1 Hhh Xxxxxxxx)

The Nnnn defines the location in the program, and the parenthesis are used in accordance with recommended programming standards. The OFS instruction is detected by the surface function program 100 of the data preparation program 86. The program responds to the active surface word and coordinate data in the block of information and causes the offset and test program 112 of output control section 102 to calculate the appropriate offset. The invention provides for the calculation of one of four possible offsets. The desired calculation is selected by utilizing one of four G codes, G0 through G3. If a G0 is programmed in the block of information, an X offset signal is calculated representing the difference in magnitudes between the programmed X word and a recorded current X coordinate signal as determined by either block 168 of FIG. 4b or block 154 of FIG. 4a depending on whether contact sensing or torque sensing is being used. The X word is a reference value representing the programmer's definition of the position of a predetermined point on the workpiece. The X offset signal is calculated and is stored in the fifth storage location of the programmed H word. In the example of the edge of the rib, only the X axis is being probed and measured; however, Y and Z offset signals may be calculated for the Y or Z axes merely by adding Y and Z words to the offset block of information.

If a G3 is programmed in the offset block of information, an X offset signal is calculated representing the difference between the X word and the maximum measured X position stored in the H word store. If a G2 is programmed in the offset block, an X offset signal is calculated representing the difference between the X word and the minimum measured X position stored in the H word store; and if, as represented above, a G1 is programmed in the offset block, an X offset signal is calculated representing the difference between the X word and the average measured X position stored in the H word store. In the present example, it is desired to locate the holes along the centerline of the rib, and it is most desirable to locate those holes from the average measured X position defining the edges of the rib.

Figure 5A:
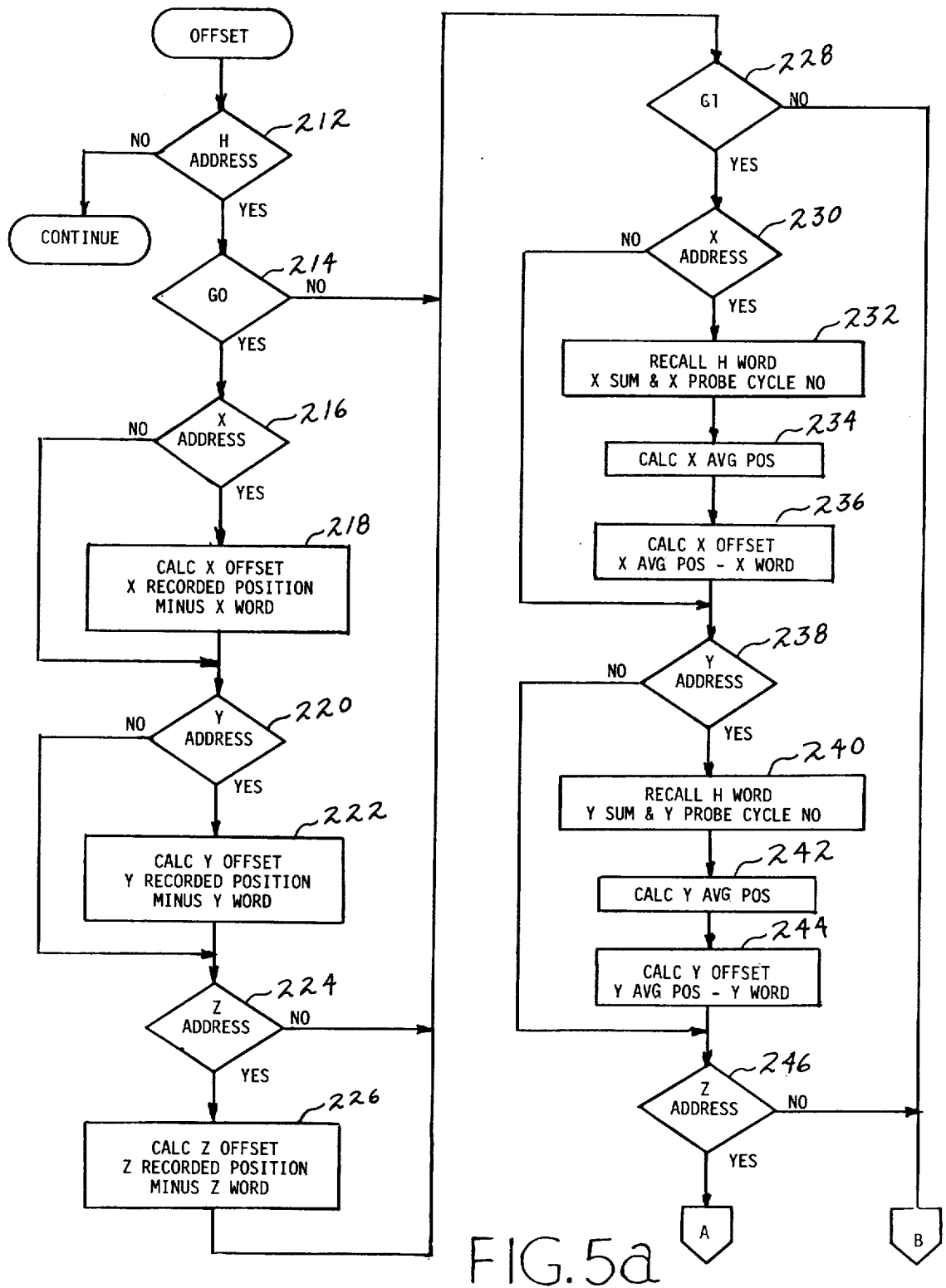
FIGS. 5a and 5b are a flow chart illustrating the process steps for calculating offsets.
Figure 5B:
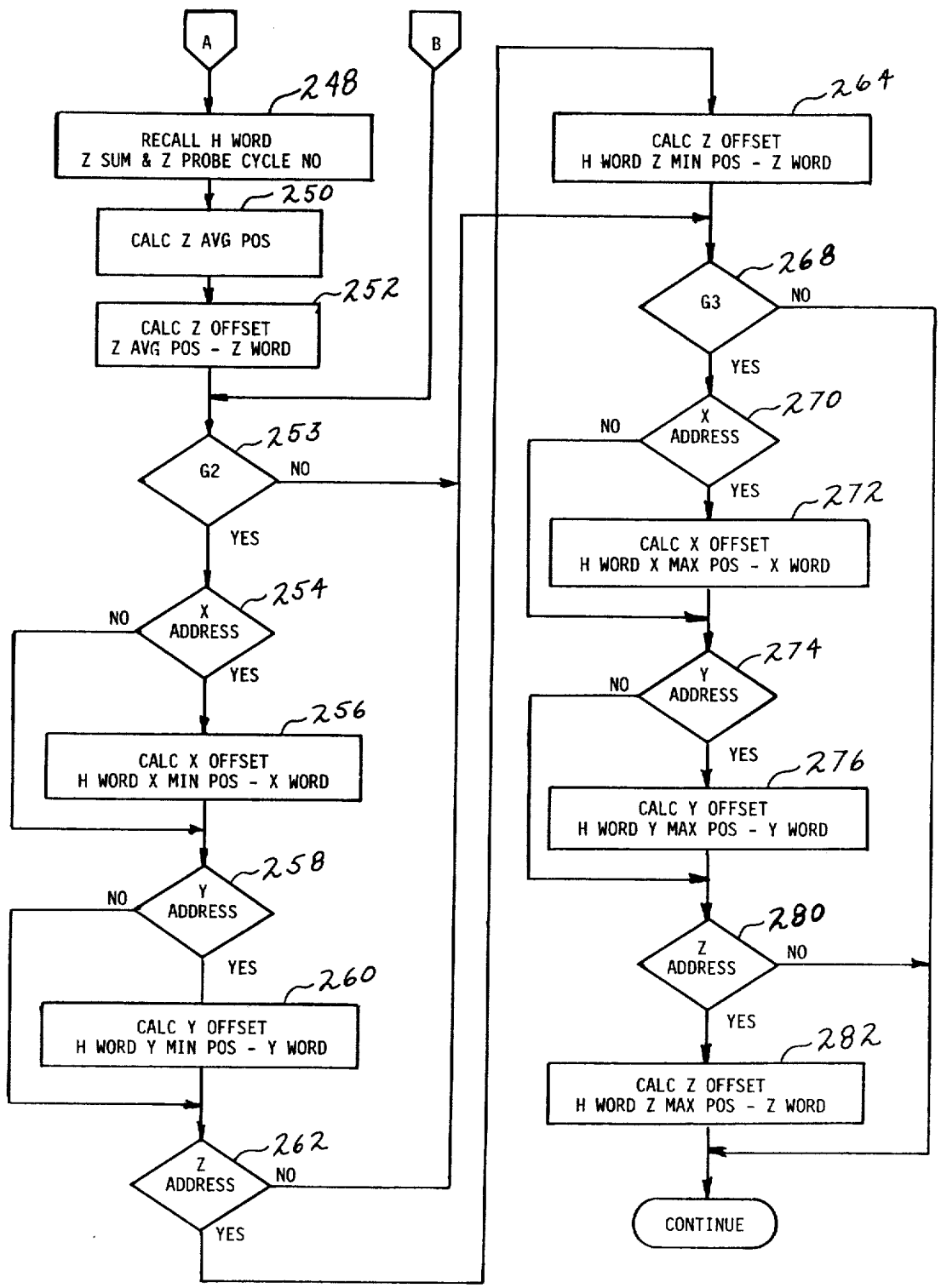

FIGS. 5a and 5b represent a flow chart illustrating process steps for executing an offset block of information. After the OFS instruction has been decoded by the data preparation program 86 of FIG. 2, the process moves to step 212 of FIG. 5a to determine the existence of an H address. If no H address is in the block of tape, it is not possible to store a calculated offset value; and therefore, the offset program is not executed. If an H address is decoded, block 214 determines whether a G0 exists. If a G0 does exist, step 216 checks for an X address. If an X address is present, block 218 will calculate an X offset by subtracting the magnitude of the X word from the magnitude of the current X coordinate signal; and an X offset signal is stored in the fifth storage location of the H word store. In a similar manner, the process in steps 220 through 226 detect the presence of Y or Z addresses, calculate Y and Z offsets and store Y and Z offset signals.

Decision step 228 determines whether a G1 instruction exists. If it does, and an X address is present as determined by block 230, blocks 232 and 234 utilize the sum of the measured positions and increment number of the identified H word to calculate an X average coordinate signal. In step 236, an offset is calculated by subtracting the magnitude of the X word from the magnitude of the X average coordinate signal; and a corresponding X offset signal is stored. Similarly, in steps 238 through 252, the process determines whether Y or Z addresses are programmed; and Y and Z offset signals are stored based on the average Y and Z coordinate signals. Decision step 253 of FIG. 5b determines whether a G2 exists; and if it does, process step 254 checks for the presence of an X address. If an X is present, process step 256 calculates an offset value by subtracting the magnitude of the X word from the magnitude of the minimum measured X position and stores a corresponding X offset signal in the fifth location of the H word store. Similarly, steps 258 through 264 determine the presence of Y or Z addresses and store Y or Z offset signals accordingly. Decision step 268 checks for the presence of a G3 instruction. This instruction, in combination with an X address as defined by step 270 will cause process step 272 to calculate an X offset value by subtracting the magnitude of the X word from the magnitude of the maximum measured X position; and store a corresponding X offset signal in the H word store. Likewise, process steps 274 through 280 determine whether Y or Z addresses are contained in the offset block of information; and Y and Z offset signals are stored accordingly.

The invention also provides the arithmetic capability of testing a measured coordinate position against programmed limits representing maxima and minima. Assume in the foregoing example, the programmer wished to test the average X coordinate signal defining the edge of the rib against upper and lower limits. To achieve this, the following block of information would be programmed:

Nnnn (TST G1 Hhh Xxxxxxxx Iiiiiiii)

The TST instruction is recognized by the surface function program 100 of the data preparation program 86 which responds to the other data in the test block of information and together with the offset and test program 112 of the output control 102 executes the desired test. Using the test function, the programmer has the option of testing up to six different values depending on the G word programmed. For example, the G1 represents a test of the average measured position against the programmed X and I words. The X word represents a lower limit defining a minimum; and the I word represents an upper limit defining maximum. If the programmer wishes to test Y or Z measured positions, a Y word and an associated J word or a Z word an an associated K word must be programmed. The presence of the X, Y or Z addresses will cause the appropriate test to be executed. It should be noted that either a lower limit or an upper limit test may be executed depending on whether the X, Y and Z or I, J and K addresses are programmed, respectively. Therefore, if only the X address is programmed, only a test against the lower limit is executed; if only the I address is programmed, only a test against the upper limit is executed.

If a G0 instruction is programmed in the test block of information, the magnitude of the recorded current coordinate signal is tested. If a G2 instruction is programmed, the minimum measured coordinate position is tested. If a G3 instruction is used in the test block, the maximum measured coordinate position is tested. If a G4 instruction is programmed, the difference between the maximum and minimum measured coordinate positions are tested. If a G5 instruction is programmed, the magnitude of the offset signal in the H word store is tested.

Figure 6A:
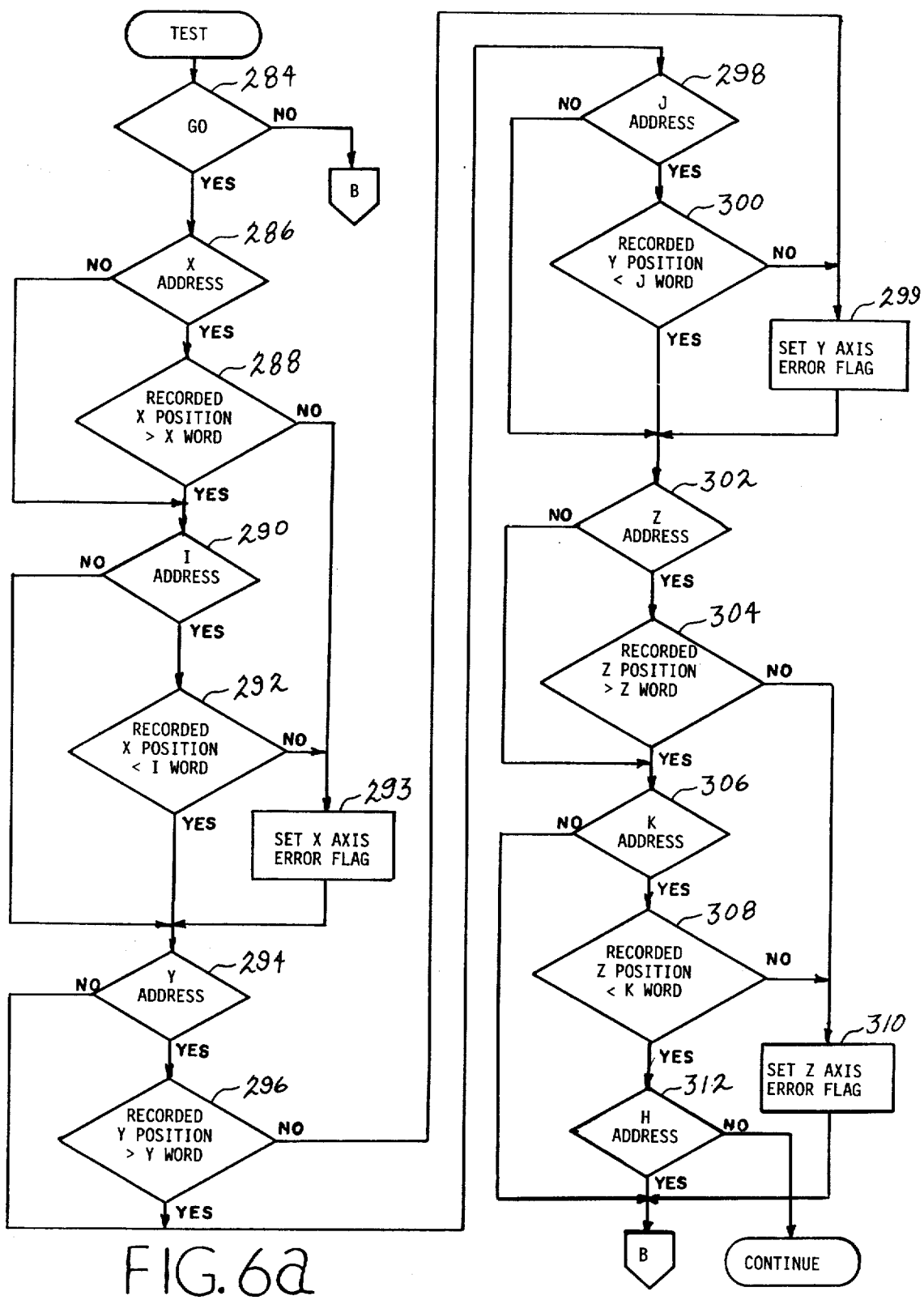
FIGS. 6a through 6f are a flow chart illustrating the process steps for testing the measured and calculated values against programmed maxima and minima.
Figure 6B:
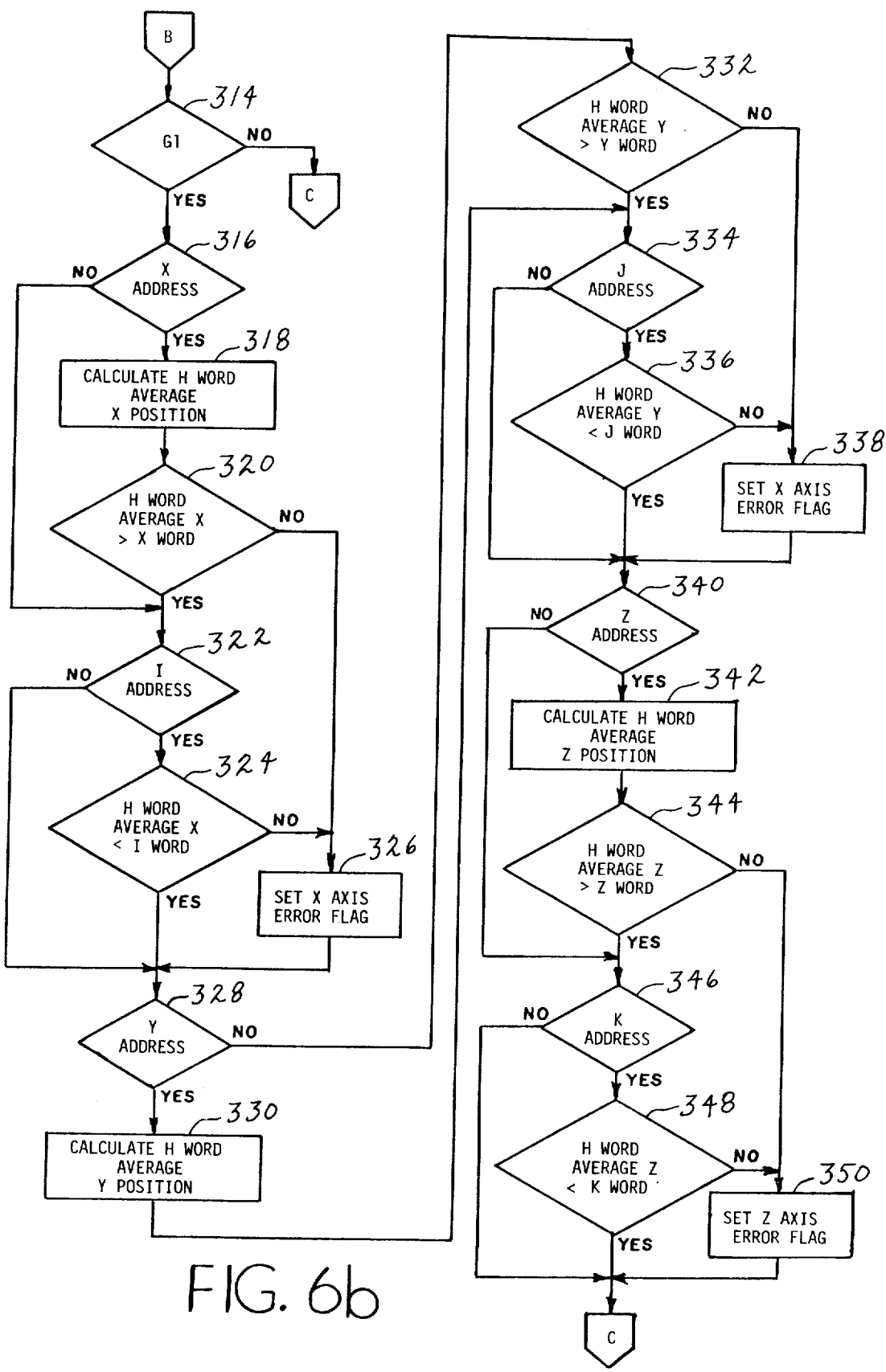
Figure 6C:
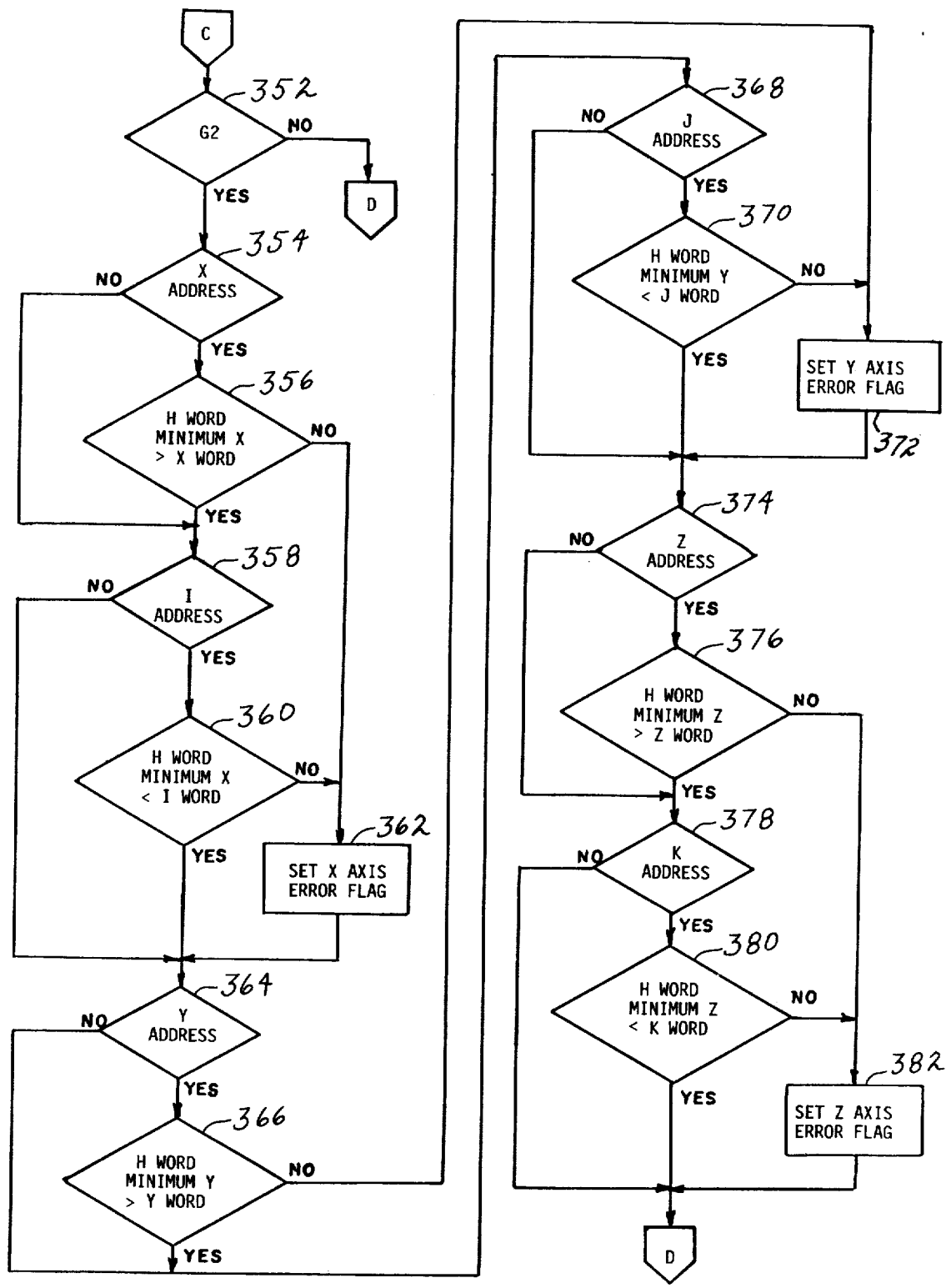
Figure 6D:
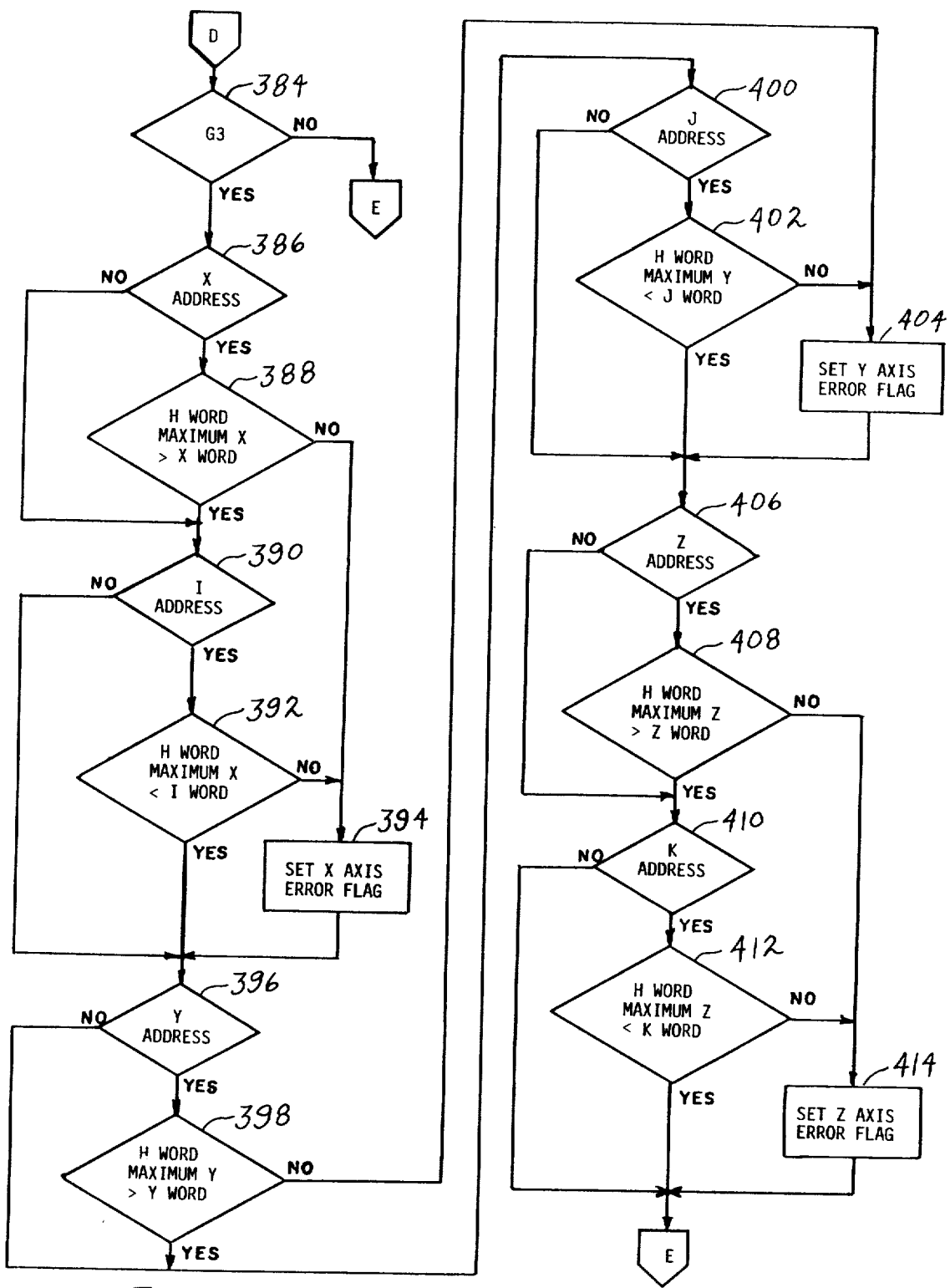
Figure 6E:
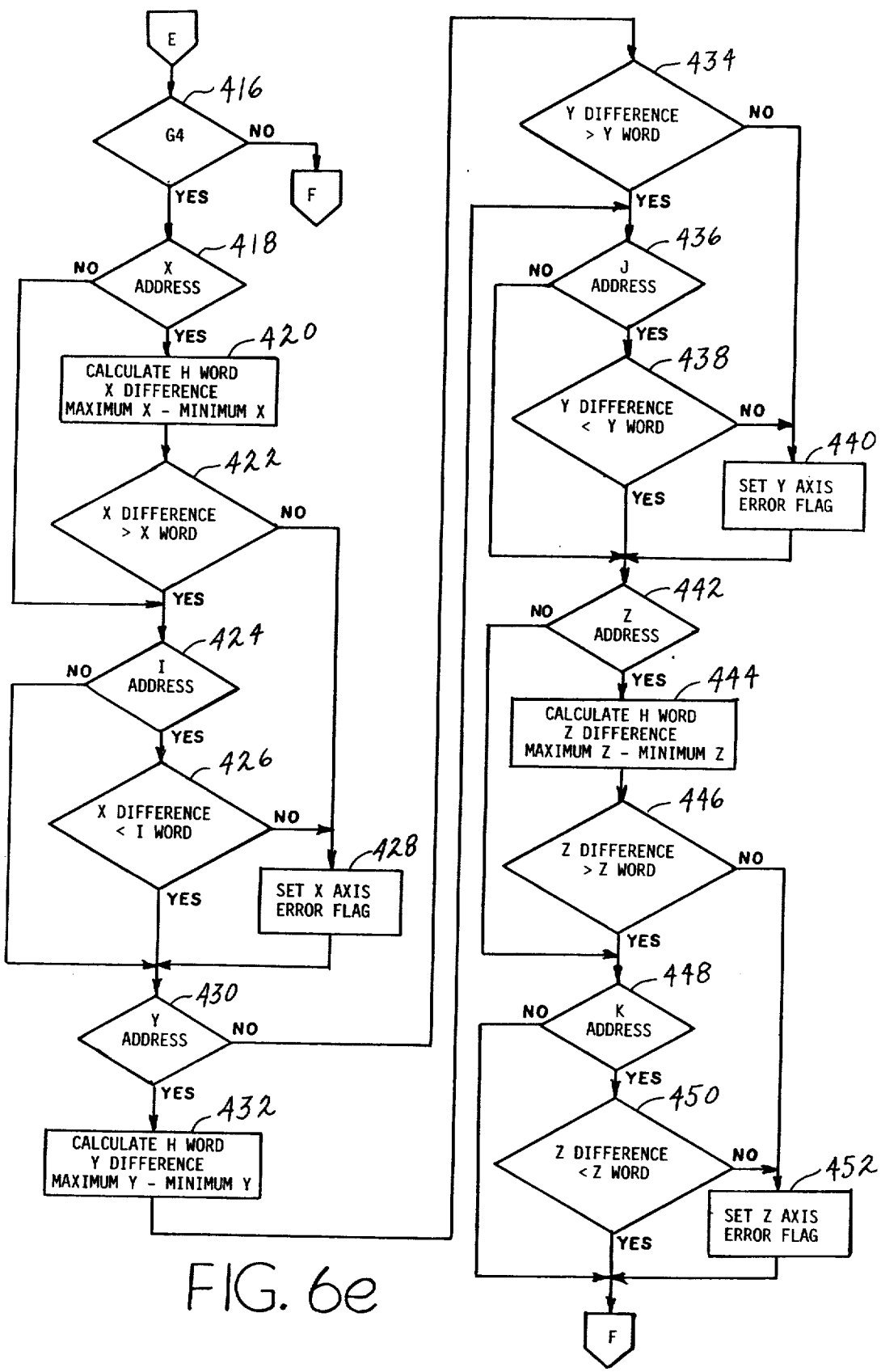
Figure 6F:
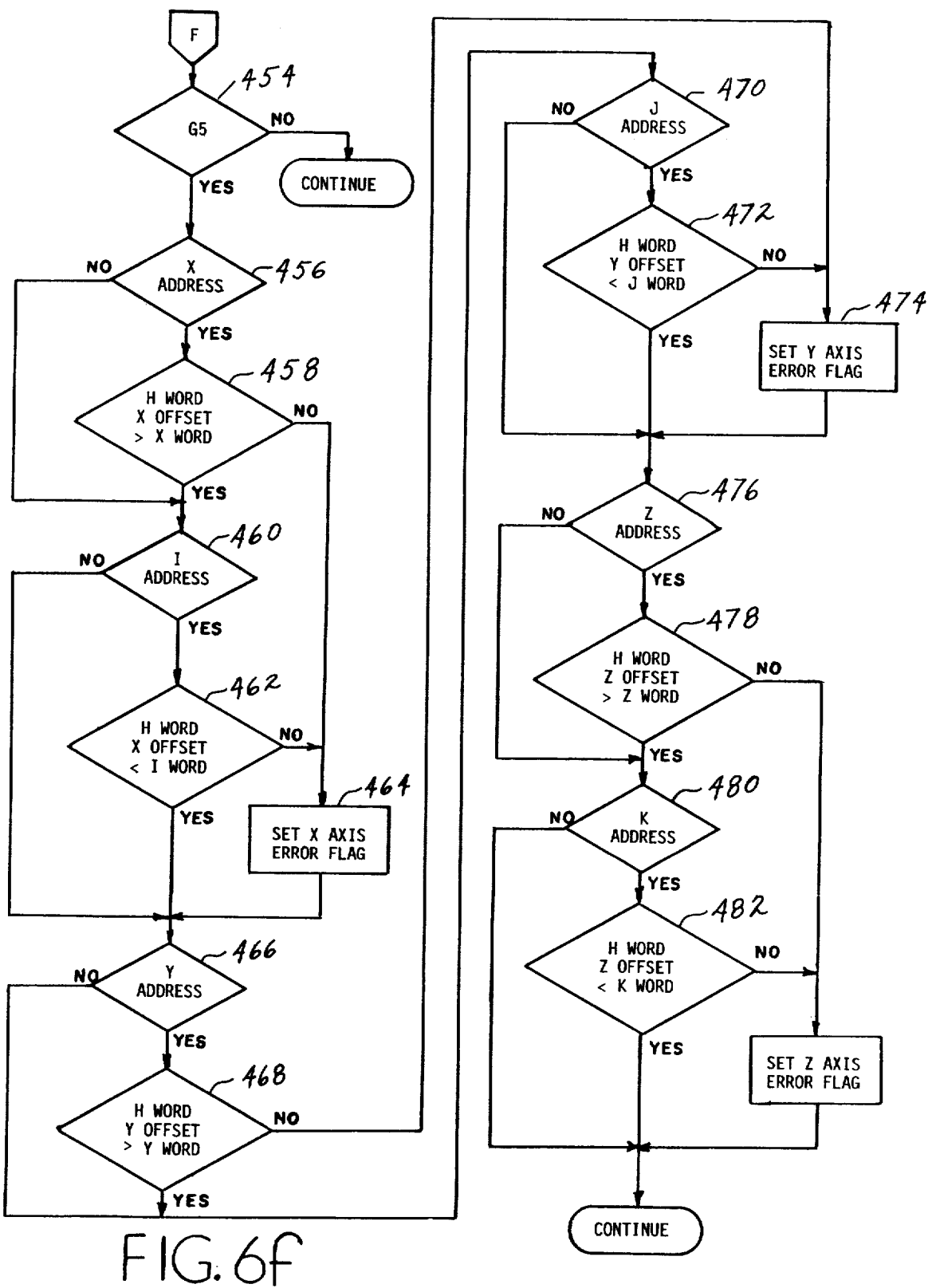

After the surface function block 100 has detected the TST or test instruction, the process illustrated by FIGS. 6a through 6e is executed. Step 284 detects the presence of a G0 instruction. If a G0 does exists, process step 286 determines the presence of an X address. If an X address is present, process step 288 determines whether the magnitude of the current X coordinate signal is greater than the magnitude of the X word which defines a minimum. If not, an error is set by step 293 indicating that the measured position is out of tolerance. Step 290 determines the presence of an I word, and step 292 determines whether the magnitude of the X coordinate signal is less than the magnitude of the I word or the maximum. If not, again, an error flag is set indicating that the measured position is out of tolerance. In a similar manner, steps 294 through 310 execute a test of the current Y and Z coordinate signals. Since the remaining tests require data from an H word store, if the H address does not exist, the test cannot be performed. Decision step 312 detects the presence of an H address. Process step 314 determines the existence of the G1 code. Decision step 316 tests for an X address. If an X address is present, process step 318 utilizes the measured sum and increment number from the designated H word store to calculate an average measured X position. In FIG. 6b, process step 320 compares the magnitude of the measured average X position against the magnitude of the X word representing a minimum. If the measured average X position is greater than the minimum, process step 322 determines the existence of an I word. Process step 324 determines whether the magnitude of the measured average X position is less than the magnitude of the I word or the programmed maximum. If either test fails, the measured average X position is outside the tolerance limits; process step 326 sets an out of tolerance error flag. In a similar manner, the measured average Y and Z positions are checked against the programmed upper and lower limits by process steps 328 through 350.

In process steps 352 through 382, the magnitudes of the minimum coordinate positions of the H word are compared against the magnitudes of the programmed maxima and minima. In process blocks 384 through 414, the magnitudes of the measured maximum coordinate positions of the H word store are compared against the magnitudes of the programmed maxima and minima. In process blocks 416 through 452, the difference between the measured maximum and minimum coordinate positions of the identified H word are checked against the programmed maxima and minima; and process blocks 454 through 484 are operative to check the magnitude of the stored offset signal against the magnitude of the programmed maxima and minima.

Figures 7, 8:
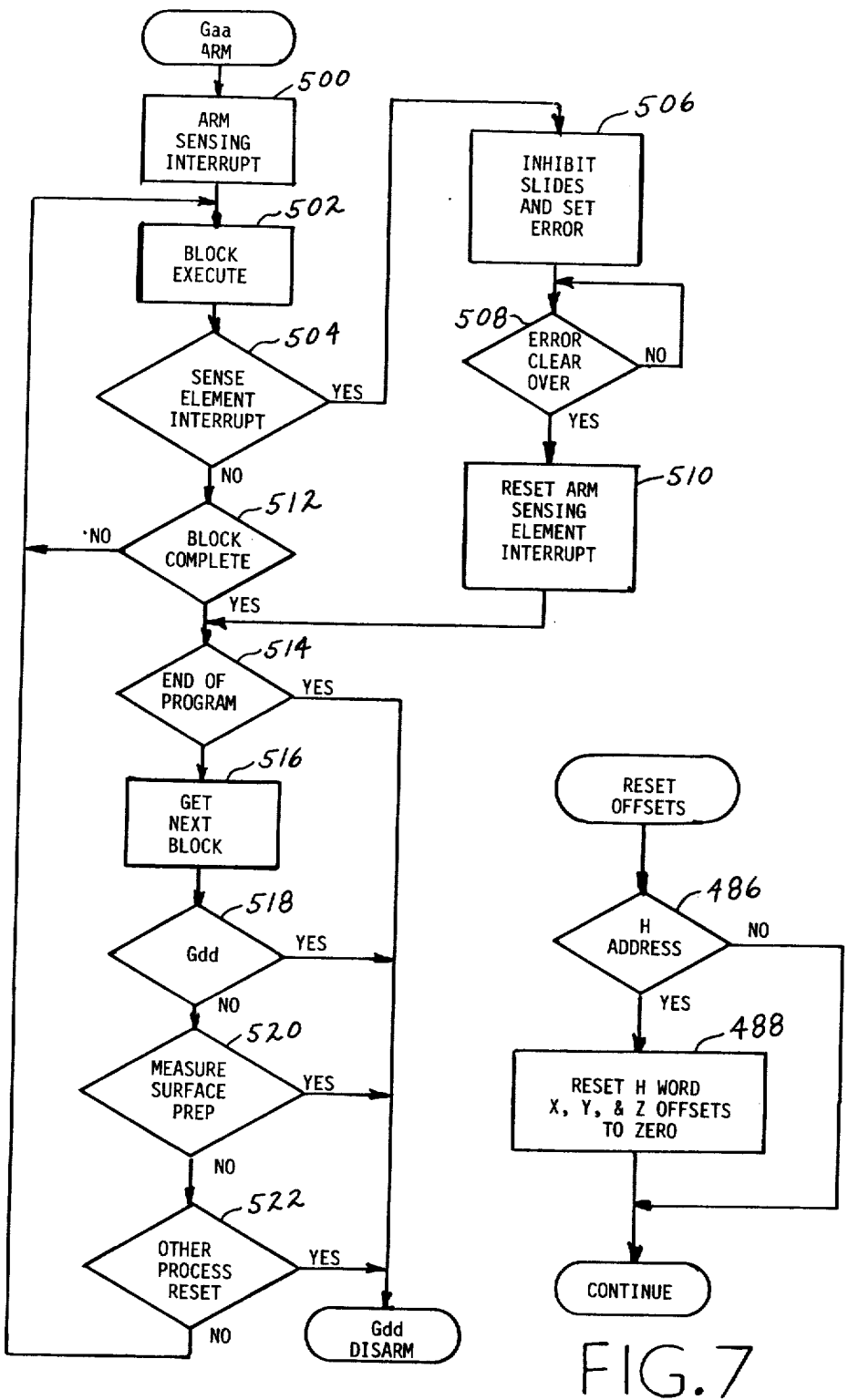
FIG. 7 is a flow chart illustrating the process steps to reset the surface data store.
FIG. 8 is a flow chart illustrating the process steps for modally activating and deactivating a surface sensing probe.

FIG. 7 illustrates the process steps to reset the H stores. To achieve this a block of information is programmed which contains a sequence number, an RST instruction and an H word. Process step 486 determines the presence of the H address, and process step 488 causes the five storage locations associated with the H word to be set to zero; therefore, the measured maximum, measured minimum, measured sum, increment number and offset positions associated with the programmed H word are reset to zero.

From the above description, it is apparent that the major sources of operator intervention in a machining process have been eliminated through the implementation of the disclosed invention. The invention provides the programmer with the capability of not only initially locating the part on the machine, but also of determining the position of characteristics of the workpiece. In addition to locating the workpiece on the machine and measuring the position of reference surfaces on the workpiece, the measuring cycle may be used to define the position of the center of a hole or boss.

To define the actual center of a hole, a scanning cycle may be executed from an assumed programmed center in one direction along an axis of motion to measure the position of a point on the circumference. Another scanning cycle is executed in the opposite direction along the axis to measure the position of another point on the circumference. By including with the instructions for the measuring cycle further instructions to store the measured average position, an offset block may be programmed to compute an offset from the measured average position which when added to the assumed center position will produce a position along the axis representing the true midpoint between the two detected points on the circumference. By repeating the above process to detect two other circumferential points along another axis of motion, the actual position to the center of the hole can be defined. A similar process may be used to locate the center of a boss.

The probe that applicants have chosen is capable of detecting deflections of the probe stylus in any of three orthogonal axes. By appropriate selection of the cutting tool, the torque control module 66 can detect torque loads generated by superficial cutting tool contacts with surfaces in any plane including the three mutually perpendicular planes defined by the same three orthogonal axes.

As a practical matter, measurement cycles restrict surface sensing to single planes aligned parallel to the planes defined by the orthogonal axes of motion of the machine slides. Therefore, a measurement span must be programmed in a single axis. In order to keep the measurement spans relatively short and at the same time be sure that the measurement span starting position provides clearance from the surface for the sensing element, a preparatory function for modal activation of the sensing element is provided to facilitate prepositioning to the measurement span starting position. This function protects the sensing element in the event it strikes an obstacle, e.g. a fixturing clamp unknown to the programmer. This function further permits the programming of spans in multiple axes and causes generation of an error signal when the sensing element detects a surface during execution of these non-measurement spans. To activate the sensing element a Gaa is programmed. Thereafter, all surface contacts detected by the sensing element will generate errors until the sensing element is deactivated by programming a deactivate sensing element preparatory function Gdd, a measuring cycle, or other process generated deactivating function, e.g. end of program, control data reset, etc.

FIG. 8 is a flow chart illustrating the modal nature of the activate/deactivate sensing element preparatory functions. As before, the data preparation program 86 decodes and stores the Gaa from the program block data. Under direction of the machine cycle control program 80, the output control programs 102 advance block processing to process step 500 of FIG. 8 causing the sensing element to be activated. The active sense element interface interrupt is armed by the interrupt arm and service program 110. The process continues to the block execute process step 502 which involves the execution of prespan functions, the span, and postspan functions as previously described. Execution of these functions will be preempted by receipt of the sensing element interrupt as indicated by decision step 504. If an interrupt occurs, the process step 506 inhibits slide motion; and sets an error in accordance with the interrupt service program 110 associated with the Gaa. The process can then continue only if the error condition is cleared or overridden as indicated by decision step 508. If the error is cleared or overridden, then process step 510 causes the sense element interrupt arm program 110 to rearm the active sensing element interface interrupt.

If no sense element interrupt occurs, the process continues to decision step 512 which determines whether block execution is complete; if not, the process continues in the loop back to the block execution step 502. Once block execution is complete, the modal nature of the Gaa function is illustrated by the decision steps 514, 518, 520 and 522. Step 514 tests for an end of program, step 518 tests for the mutually exclusive preparatory function Gdd decoded from subsequent program blocks, step 520 tests for the cancelling measuring cycle preparatory functions and step 522 tests for other process generated resets. If any of these tests detects the tested condition, the process ends at step 524 which causes the interrupt arm and service program 110 to disarm the active element interface interrupt. If any tested condition is not met, the process continues to subsequent decision steps; and if no tested condition is met, the process continues by moving to block execution at process step 502. Step 516 illustrates that the active condition of the sensing element is maintained during execution of subsequent blocks of the same program since this process step causes the machine cycle control program 80 to effect the input of subsequent program blocks.

As will be appreciated by those who are skilled in the art, the actual codes used to execute the foregoing functions will depend on the system designer and the characteristics of a particular computer numerical control. Therefore, the particular codes utilized in the above description should not be considered to be limitations on the claimed invention. Further, as previously suggested, other force measuring systems could be used in place of the sensing elements described in detail herein. Such systems include those capable of measuring loads on machine slides, spindle or tool holder deflections, etc.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. A method for measuring the actual position of unmachined surfaces on a workpiece and modifying command signals derived from a machining program defining a cycle of operation of a machine relative to the unmachined surfaces, said machine having machine slides moving along axes of motion for effecting relative movement between the workpiece and a tool holder having a sensing element associated therewith, said machine being connected to a control for storing the machining program and generating the command signals to control the relative motion, the method comprising the steps of:
  (a) storing scanning program instructions in association with the machining program to define a scanning cycle for using the sensing element to measure the actual position of the unmachined surfaces;
  (b) executing the scanning cycle prior to executing the cycle of operation in response to the scanning program instructions to generate coordinate signals representing positions of detected points on the unmachined surfaces;
  (c) storing selected ones of the coordinate signals; and
  (d) executing the cycle of operation after completing the scanning cycle by generating modified command signals in response to the selected coordinate signals and the command signals derived from the machining program, said modified command signals effecting relative motion between the tool holder and the workpiece in accordance with the machining program and independent of variations in the position of the unmachined surfaces.

2. A method for measuring the actual position of an unmachined planar surface on a workpiece and modifying command signals derived from a machining program defining the operation of a machine, said machine having machine slides moving along axes of motion for effecting relative movement between the workpiece and a tool holder having a sensing element associated therewith, said machine being connected to a control for storing the machining program and generating the command signals to control the relative motion, the method comprising the steps of:
  (a) storing scanning program instructions in association with the machining program to define a scanning cycle for using the sensing element to measure the actual position of a plurality of points on the planar surface;
  (b) executing the scanning cycle in response to the scanning program instructions to generate coordinate signals representing the plurality of points on the planar surface;
  (c) storing a number of the coordinate signals; and
  (d) generating modified command signals in response to the stored coordinate signals and the command signals derived from the machining program, said modified command signals effecting relative motion between the tool holder and the workpiece in accordance with the machining program and independent of variations in the position of the planar surface.

3. A method for measuring the actual position of an unmachined planar surface on a workpiece and modifying command signals derived from a machining program defining the operation of a machine, the machining program containing a reference coordinate value representing a predetermined point on the workpiece, and said machine having machine slides moving along axes of motion for effecting relative movement between the workpiece and a toolholder having a sensing element associated therewith, the machine being connected to a control for storing the machining program and generating the command signal to control the relative motion, the method comprising the steps of:
- (a) storing a scanning program in association with the machining program to define a scanning cycle for using the sensing element to measure the actual position of a plurality of points on the planar surface;
- (b) generating in response to the scanning program scanning command signals to position the sensing element opposite a point on the planar surface;
- (c) generating further scanning command signals to cause the sensing element to move along an axis of motion toward the planar surface;
- (d) terminating the motion of the sensing element in response to the sensing element detecting a point on the planar surface;
- (e) producing a coordinate signal defining the position of the detected point along the axis of motion;
- (f) generating an offset signal as a function of the coordinate signal and the reference coordinate value;
- (g) storing the offset signal;
- (h) iterating steps (b) through (g) a predetermined number of times defined by the scanning program to measure the position of a number of different points on the planar surface; and
- (i) generating modified command signals in response to the offset signals and the command signals derived from the machining program, said modified command signals effecting relative motion between the tool holder and the planar surface in accordance with the machining program.

4. The method of claim 3 wherein the method further comprises the steps of:
- (a) storing with the scanning program test instructions defining an upper limit representing a maximum;
- (b) comparing the coordinate signal to the upper limit; and
- (c) generating an error signal in response to the magnitude of the coordinate signal exceeding the magnitude of the upper limit.

5. The method of claim 3 wherein the method further comprises the steps of:
- (a) storing with the scanning program test instructions defining a lower limit representing a minimum;
- (b) comparing the coordinate signal to the lower limit; and
- (c) generating an error signal in response to the magnitude of the coordinate signal being less than the magnitude of the lower limit.

6. The method of claim 3 wherein the step of generating an offset signal further comprises the step of generating a first offset signal representing the difference in magnitudes between the coordinate signal and the reference coordinate value.

7. The method of claim 3 wherein after the step of producing a coordinate signal the method comprises the step of storing the coordinate signal.

8. The method of claim 7 wherein the step of generating an offset signal further comprises the steps of:
- (a) comparing during each iteration the magnitude of the coordinate signal with the magnitude of a previously stored coordinate signal;
- (b) storing a larger coordinate signal representing the larger of the coordinate signal and the previously stored coordinate signal; and
- (c) generating a second offset signal representing the difference in magnitude between the larger coordinate signal and the reference coordinate value.

9. The method of claim 7 wherein the step of generating an offset signal further comprises the steps of:
- (a) comparing during each iteration the magnitude of the coordinate signal with the magnitude of a previously stored coordinate signal;
- (b) storing a smaller coordinate signal representing the smaller of the coordinate signal and the previously stored coordinate signal; and
- (c) generating a third offset signal representing the difference in magnitudes between the smaller coordinate signal and the reference coordinate value.

10. The method of claim 7 wherein the step of generating an offset signal further comprises the steps of:
- (a) adding during each iteration the magnitude of the coordinate signal to a sum of the magnitudes of previously stored coordinate signals to produce a sum coordinate signal;
- (b) storing the number of iterations;
- (c) producing an average coordinate value signal representing the quotient of the magnitude of the sum coordinate signal divided by the number of iterations; and
- (e) generating a fourth offset signal representing the difference in magnitudes between the average coordinate signal and the reference coordinate value.

11. The method of claim 1 or 2 wherein the step of executing the scanning cycle further comprises the steps of:
- (a) generating scanning command signals to position the sensing element opposite a point on the workpiece surface;
- (b) generating further scanning command signals to cause the sensing element to move along an axis of motion towards the workpiece surface;
- (c) terminating the motion of the sensing element in response to the sensing element detecting a point on the workpiece surface;
- (d) producing a coordinate signal defining the position of the detected point along the axis of motion; and
- (e) iterating steps (a) through (d) a predetermined number of times defined by the scanning cycle to measure the position of a number of different points thereby defining the position of the reference surface.

12. The method of claim 11 wherein the step of generating scanning command signals further comprises the steps of:
- (a) storing sensing element activate and deactivate instructions in the scanning program to modally activate the sensing element;
- (b) moving the sensing element in response to the scanning command signals;
- (c) terminating motion of the sensing element in response to the sensing element detecting the workpiece; and (d) generating an error signal in response to contact between the sensing element and the workpiece.

13. The method of claim 11 wherein the step of generating further scanning command signals further comprises the steps of:
   (a) storing in the scanning program a surface measurement instruction and associated data defining an axial position on the axis of motion inside the workpiece surface;
   (b) moving the sensing element in response to the further scanning command signals along the axis of motion toward the axial position;
   (c) terminating motion of the sensing element in response to the sensing element reaching the axial position; and
   (d) producing an error signal representing a failure of the sensing element to sense the workpiece surface.

14. The method of claim 11 wherein the sensing element comprises a contact actuated probe and the steps of terminating motion of the sensing element and producing a coordinate signal further comprise the steps of:
   (a) terminating motion of the sensing element in response to the sensing element contacting a point on the workpiece surface;
   (b) producing an initial position signal representing the position of the point on the workpiece surface in response to the sensing element contacting the point on the workpiece surface;
   (c) generating in response to the initial position signal a retreat command signal to move the sensing element along the axis of motion to a position a predetermined distance inside the workpiece surface;
   (d) generating a data acquisition command signal to move the sensing element along the axis of motion away from the workpiece surface at a predetermined slower feed rate;
   (e) terminating motion of the sensing element in response to the sensing element losing contact with the point on the surface;
   (f) producing a coordinate signal representing the position of the point on the surface along the axis of motion in response to the sensing element losing contact with the surface; and
   (g) generating in response to the coordinate signal a final command signal to move the sensing element along the one axis of motion toward the surface to a position adjacent to the point on the surface.

15. The method of claim 14 wherein the axes of motion of the machine further comprise a mutually perpendicular triordinate coordinate system and the control further includes means for storing a first compensation signal representing the radius of the sensing element and a second compensation signal representing the length of the sensing element and the step of producing a coordinate signal further comprises the steps of:
   (a) producing a slide position signal representing the position of the sensing element along the axis of motion in response to the sensing element losing contact with the workpiece;
   (b) modifying the slide position signal by the first compensation signal to produce the coordinate signal in response to the axis of motion being one of two of the axes of motion; and
   (c) modifying the slide position signal by the second compensation signal to produce the coordinate signal in response to the axis of motion being the third of the axes of motion.

16. The method of claim 11 wherein the sensing element comprises a cutting tool and the control includes a torque measuring circuit responsive to the cutting tool for generating a contact signal in response to the cutting torque imposed on the cutting tool being at least equal to a predetermined torque limit representing superficial contact of the cutting tool on the workpiece, and the steps of terminating motion of the sensing element and producing a coordinate signal further comprise the steps of:
   (a) terminating motion of the sensing element in response to the contact signal;
   (b) producing a coordinate signal representing the position of the cutting tool in response to the contact signal; and
   (c) producing in response to the coordinate signal a retreat command signal to move the sensing element away from the reference surface along the axis of motion.

17. The method of claim 16 wherein the axes of motion of the machine further comprise a mutually perpendicular triordinate coordinate system and the control further includes means for storing a first compensation signal representing a radius of the sensing element and a second compensation signal representing the length of the sensing element and the step of producing a coordinate signal further comprises the steps of:
   (a) producing a slide position signal representing the position of the sensing element along the axis of motion in response to the sensing element contacting with the workpiece;
   (b) modifying the slide position signal by the first compensation signal to produce the coordinate signal in response to the axis of motion being one of two of the axes of motion; and
   (c) modifying the slide position signal by the second compensation signal to produce the coordinate signal in response to the axis of motion being the third of the axes of motion.

18. The method of claim 11 wherein the machining program contains a reference value representing a predefined point relative to the workpiece and the step of storing selected coordinate signals further comprises the steps of:
   (a) generating a first offset signal representing the difference in magnitudes between a current coordinate signal and the reference value; and
   (b) storing the first offset signal.

19. The method of claim 11 wherein the method further comprises the steps of:
   (a) storing a scanning program including test instructions defining an upper limit representing a maximum;
   (b) comparing a current coordinate signal to the upper limit; and (c) generating an error signal in response to the magnitude of the current coordinate signal exceeding the magnitude of the upper limit.

20. The method of claim 11 wherein the method further comprises the steps of:
   (a) storing a scanning program including test instructions defining a lower limit representing a minimum;
   (b) comparing a current coordinate signal to the lower limit; and
   (c) generating an error signal in response to the magnitude of the current coordinate signal being less than the magnitude of the lower limit.

21. The method of claim 11 wherein the step of storing selected coordinate signals further comprises the steps of:
 (a) comparing during each iteration a current coordinate signal with a previously stored coordinate signal; and
 (b) storing the larger coordinate signal representing the maximum measured coordinate position on the reference surface.

22. The method of claim 21 wherein the machining program contains a reference value representing a predefined point relative to the workpiece and the step of storing selected coordinate signals further comprises the steps of:
 (a) generating a second offset signal representing the difference in magnitudes between the larger coordinate signal and the reference value; and
 (b) storing the second offset signal.

23. The method of claim 22 wherein the method further comprises the steps of:
 (a) storing a scanning program including test instructions defining an upper limit representing a maximum;
 (b) comparing one of the offset signals to the upper limit; and
 (c) generating an error signal in response to the magnitude of one of the offset signals exceeding the magnitude of the upper limit.

24. The method of claim 22 wherein the method further comprises the steps of:
 (a) storing a scanning program including test instructions defining a lower limit representing a minimum;
 (b) comparing one of the offset signals to the lower limit; and
 (c) generating an error signal in response to the magnitude of the one of the offset signals being less than the magnitude of the lower limit.

25. The method of claim 22 wherein the step of generating modified command signals further comprises the step of modifying the command signals derived from the machining program by one of the offset signals.

26. The method of claim 21 wherein the method further comprises the steps of:
 (a) storing a scanning program including test instructions defining an upper limit representing a maximum;
 (b) comparing the larger coordinate signal to the upper limit; and
 (c) generating an error signal in response to the magnitude of the larger coordinate signal exceeding the magnitude of the upper limit.

27. The method of claim 21 wherein the method further comprises the steps of:
 (a) storing a scanning program including test instructions defining a lower limit representing a minimum;
 (b) comparing the larger coordinate signal to the lower limit; and
 (c) generating an error signal in response to the magnitude of the larger coordinate signal being less than the magnitude of the lower limit.

28. The method of claim 21 wherein the step of storing selected coordinate signals further comprises the steps of:
 (a) comparing during each iteration a current coordinate signal with a previously stored coordinate signal; and
 (c) storing the smaller coordinate signal representing the minimum measured coordinate position on the reference surface.

29. The method of claim 28 wherein the machining program contains a reference value representing a predefined point relative to the workpiece and the step of storing selected coordinate signals further comprises the steps of:
 (a) generating a third offset signal representing the difference in magnitudes between the smaller coordinate signal and the reference value; and
 (b) storing the third offset signal.

30. The method of claim 29 wherein the method further comprises the steps of:
 (a) storing a scanning program including test instructions defining an upper limit representing a maximum;
 (b) comparing one of the offset signals to the upper limit; and
 (c) generating an error signal in response to the magnitude of one of the offset signals exceeding the magnitude of the upper limit.

31. The method of claim 29 wherein the method further comprises the steps of:
 (a) storing a scanning program including test instructions defining a lower limit representing a minimum;
 (b) comparing one of the offset signals to the lower limit; and
 (c) generating an error signal in response to the magnitude of the one of the offset signals being less than the magnitude of the lower limit.

32. The method of claim 29 wherein the step of generating modified command signals further comprises the step of modifying the command signals derived from the machining program by one of the offset signals.

33. The method of claim 28 wherein the method further comprises the steps of:
 (a) storing a scanning program including test instructions defining an upper limit representing a maximum;
 (b) comparing the smaller coordinate signal to the upper limit; and
 (c) generating an error signal in response to the magnitude of the smaller coordinate signal exceeding the magnitude of the upper limit.

34. The method of claim 28 wherein the method further comprises the steps of:
 (a) storing a scanning program including test instructions defining a lower limit representing a minimum;
 (b) comparing the smaller coordinate signal to the lower limit; and
 (c) generating an error signal is response to the magnitude of the smaller coordinate signal being less than the magnitude of the lower limit.

35. The method of claim 28 wherein the method further comprises the steps of:
 (a) storing a scanning program including test instructions defining an upper limit representing a maximum;
 (b) generating a difference signal representing the difference between the larger coordinate signal and the smaller coordinate signal;

(c) comparing the difference signal to the upper limit; and (d) generating an error signal in response to the magnitude of the difference signal exceeding the magnitude of the upper limit.

36. The method of claim 28 wherein the method further comprises the steps of:
(a) storing a scanning program including test instructions defining a lower limit representing a minimum;
(b) generating a difference signal representing the difference in magnitudes between the larger coordinate signal and the smaller coordinate signal;
(c) comparing the difference signal to the lower limit; and
(d) generating an error signal in response to the magnitude of the difference signal being less than the magnitude of the lower limit.

37. The method of claim 28 wherein the step of storing selected coordinate signals further comprises the steps of:
(a) adding during each iteration a current coordinate signal to a sum of previously stored coordinate signals to produce a sum of the measured positions; and
(b) storing the number of iterations.

38. The method of claim 37 wherein the machine program contains a reference value representing a predefined point relative to the workpiece and the step of storing selected coordinate signals further comprises the steps:
(a) producing an average coordinate value signal representing the quotient of the sum of the magnitudes of the stored coordinate signals divided by the number of iterations;
(b) generating a fourth offset signal representing the difference in magnitudes between the average coordinate signal and the reference value; and
(c) storing the fourth offset signal.

39. The method of claim 38 wherein the method further comprises the steps of:
(a) storing a scanning program including test instructions defining an upper limit representing a maximum;
(b) comparing one of the offset signals to the upper limit; and
(c) generating an error signal in response to the magnitude of one of the offset signals exceeding the magnitude of the upper limit.

40. The method of claim 38 wherein the method further comprises the steps of:
(a) storing a scanning program including test instructions defining a lower limit representing a minimum;
(b) comparing one of the offset signals to the lower limit; and
(c) generating an error signal in response to the magnitude of the one of the offset signals being less than the magnitude of the lower limit.

41. The method of claim 38 wherein the step of generating modified command signals further comprises the step of modifying the command signals derived from the machining program by one of the offset signals.

42. The method of claim 37 wherein the method further comprises the steps of:

(a) storing a scanning program including test instructions defining an upper limit representing a maximum;
(b) producing an average coordinate representing the quotient of the sum of the magnitudes of the stored coordinate signals divided by the number of iterations;
(c) comparing the average coordinate signal to the upper limit; and
(d) generating an error signal in response to the magnitude of the average coordinate signal exceeding the magnitude of the upper limit.

43. The method of claim 37 wherein the method further comprises the steps of:
(a) storing a scanning program including test instructions defining a lower limit representing a minimum;
(b) producing an average coordinate representing the quotient of the sum of the magnitudes of the stored coordinate signals divided by the number of iterations;
(c) comparing the average coordinate signal to the lower limit; and
(d) generating an error signal in response to the magnitude of the average coordinate signal being less than the lower limit.

44. The method of claim 18 wherein the method further comprises the steps of:
(a) storing a scanning program including test instructions defining an upper limit representing a maximum;
(b) comparing one of the offset signals to the upper limit; and
(c) generating an error signal in response to the magnitude of one of the offset signals exceeding the magnitude of the upper limit.

45. The method of claim 18 wherein the method further comprises the steps of:
(a) storing a scanning program including test instructions defining a lower limit representing a minimum;
(b) comparing one of the offset signals to the lower limit; and
(c) generating an error signal in response to the magnitude of the one of the offset signals being less than the magnitude of the lower limit.

46. The method of claim 18 wherein the step of generating modified command signals further comprises the step of modifying the command signals derived from the machining program by one of the offset signals.

47. A method for measuring the actual position of workpiece surfaces and modifying command signals derived from a machining program defining the operation of a machine, said machine having machine slides moving along axes of motion for effecting relative motion between the workpiece and a tool holder having a cutting tool associated therewith, said machine being connected to a control for storing the machining program and generating command signals to control the relative motion, said control including a torque measuring circuit responsive to the cutting tool for producing a contact signal in response to cutting forces imposed on the tool being at least equal to a predetermined torque limit representing superficial contact of the cutting tool on the workpiece, the method comprising the steps of:

(a) storing scanning program instructions in association with the machining program to define a scanning cycle for measuring the actual position of a surface of a workpiece;

(b) generating in response to the scanning program instructions first command signals to move the cutting tool along one axis of motion towards a point on the surface;

(c) terminating the motion of the cutting tool in response to the contact signal;

(d) generating a coordinate signal representing the position of the point on the surface in response to the contact signal;

(e) generating a second command signal in response to the coordinate signal to move the tool away from the workpiece;

(f) iterating steps (b) through (e) to produce a number of coordinate signals representing the position of a plurality of points on the surface;

(g) storing selected coordinate signals; and (h) generating modified command signals in response to the stored coordinate signal and the command signals derived from the machining program, said modified command signals effecting relative motion between the cutting tool and the workpiece in accordance with the machining program and independent of variations in the position of the surface.

48. A method for modifying slide position command signals derived from a machining program defining the operation of a machine with respect to a program coordinate system, the machine having slides moving along axes of motion defining a mutually perpendicular triordinate machine coordinate system for effecting relative motion between a workpiece and a tool holder having a sensing element associated therewith, the sensing element comprising a cutting tool and the control including a torque measuring circuit for generating a contact signal in response to cutting torque being at least equal to a torque limit representing a superficial contact between the tool and workpiece, the machine being connected to a control for storing the machining program and generating slide position command signals in response thereto to control the relative motion, the method comprising the steps of:

(a) storing workpiece locating instructions in association with the machining program;

(b) executing the workpiece locating instructions to use the sensing element to generate translated current slide position signals representing current slide positions translated with respect to the machine coordinate system; and (c) generating modified slide position command signals in response to the translated current slide position signals and the machining program, thereby effecting translation of the program coordinate system with respect to the machine coordinate system.

49. The method of claim 48 wherein the workpiece locating instructions comprise an assumed coordinate signal and the step of executing the workpiece locating instructions comprises the steps of:

(a) effecting slide motion along one axis of motion to produce relative motion of the cutting tool toward a locating reference surface of the workpiece;

(b) generating a current slide position signal continuously representing the coordinate value of the slide position with respect to the machine coordinate system in response to the slide motion;

(c) terminating the slide motion in response to the contact signal;

(d) producing a translated current slide position signal in response to the termination of motion and in response to the assumed coordinate signal and the current slide position signal; and (e) iterating steps (a) through (d) to produce a number of translated current slide position signals equal to the number of axes of motion.

50. The method of claim 49 wherein the machining program further comprises first slide position commands and the step of effecting slide motion further comprises the steps of (a) activating the sensing element;

(b) executing first slide position commands to position the cutting tool at a point away from the locating reference surface;

(c) terminating motion and generating an error signal in response to the sensing element producing a contact signal during execution of the first slide position commands;

(d) generating an attack command signal in response to positioning the cutting tool at the point away from the surface; and (e) effecting slide motion along one axis of motion to produce relative motion of the cuttng tool toward the locating reference surface in response to the attack command signal.

51. The method of claim 50 wherein the assumed coordinate signal represents a predetermined position relative to the locating reference surface with respect to the machine coordinate system and the step of producing the translated current slide position signal further comprises the step of replacing the value of the current slide position signal with the value represented by the assumed coordinate signal.

* * * * *